(12) United States Patent
Macdonald et al.

(10) Patent No.: US 7,835,832 B2
(45) Date of Patent: Nov. 16, 2010

(54) VEHICLE CONTROL SYSTEM

(75) Inventors: Andrew John Macdonald, Graceville (AU); David Robert Reeve, Chapel Hill (AU); Campbell Robert Morrison, Corinda (AU)

(73) Assignee: Hemisphere GPS LLC, Calgary (CA)

( * ) Notice: Subject to any disclaimer, the term of this patent is extended or adjusted under 35 U.S.C. 154(b) by 615 days.

(21) Appl. No.: 11/620,388

(22) Filed: Jan. 5, 2007

(65) Prior Publication Data

US 2008/0167770 A1    Jul. 10, 2008

(51) Int. Cl.
 *G05D 1/00* (2006.01)
(52) U.S. Cl. .......................................... 701/24; 706/20
(58) Field of Classification Search .................. 701/50, 701/109, 213, 24
 See application file for complete search history.

(56) References Cited

U.S. PATENT DOCUMENTS

| | | | |
|---|---|---|---|
| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran |
| 4,180,133 A | 12/1979 | Collogan et al. |
| 4,398,162 A | 8/1983 | Nagai |

(Continued)

FOREIGN PATENT DOCUMENTS

JP    07244150    9/1995

(Continued)

OTHER PUBLICATIONS

Parkinson, Bradford W., et al., "Global Positioning System: Theory and Applications, vol. II", Bradford W. Parkinson and James J. Spiker, Jr., eds. Global Postioning System: Theory and Applicaitons, vol. II, 1995, AIAA, Reston, VA USA pp. 3-50, (1995),3-50.

(Continued)

*Primary Examiner*—Khoi Tran
*Assistant Examiner*—Rodney King
(74) *Attorney, Agent, or Firm*—Mark E. Brown

(57) ABSTRACT

A vehicle control system having a controller and a spatial database adapted to provide spatial data to the controller at control speed. The spatial data provided from the spatial database to the controller can be any kind of data or information that has some relationship or association with "real world" geographical location, or if it is stored somehow with reference to geographical location. The spatial data received by the controller from the database forms at least part of the control inputs that the controller operates on to control the vehicle. The fact that the controller operates directly on information that is inherently associated with "real world" geographic location represents a change in thinking compared with existing vehicle control systems. In particular, it means that the control system of the present invention "thinks" directly in terms of spatial location. A vehicle control system in accordance with one particular embodiment of the invention comprises a task path generator, a spatial database, at least one external spatial data receiver, a vehicle attitude compensation module, a position error generator, a controller, and actuators to control the vehicle.

43 Claims, 7 Drawing Sheets

U.S. PATENT DOCUMENTS

| | | | |
|---|---|---|---|
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |
| 4,710,775 A | 12/1987 | Coe |
| 4,714,435 A | 12/1987 | Stipanuk et al. |
| 4,739,448 A | 4/1988 | Rowe et al. |
| 4,751,512 A | 6/1988 | Longaker |
| 4,769,700 A | 9/1988 | Pryor |
| 4,785,463 A | 11/1988 | Janc et al. |
| 4,802,545 A | 2/1989 | Nystuen et al. |
| 4,812,991 A | 3/1989 | Hatch |
| 4,858,132 A | 8/1989 | Holmquist |
| 4,864,320 A | 9/1989 | Munson et al. |
| 4,894,662 A | 1/1990 | Counselman |
| 4,916,577 A | 4/1990 | Dawkins |
| 4,918,607 A | 4/1990 | Wible |
| 4,963,889 A | 10/1990 | Hatch |
| 5,031,704 A | 7/1991 | Fleischer et al. |
| 5,100,229 A | 3/1992 | Lundberg et al. |
| 5,134,407 A | 7/1992 | Lorenz et al. |
| 5,148,179 A | 9/1992 | Allison |
| 5,152,347 A | 10/1992 | Miller |
| 5,155,490 A | 10/1992 | Spradley et al. |
| 5,155,493 A | 10/1992 | Thursby et al. |
| 5,156,219 A | 10/1992 | Schmidt et al. |
| 5,165,109 A | 11/1992 | Han et al. |
| 5,173,715 A | 12/1992 | Rodal et al. |
| 5,177,489 A | 1/1993 | Hatch |
| 5,185,610 A | 2/1993 | Ward et al. |
| 5,191,351 A | 3/1993 | Hofer et al. |
| 5,202,829 A | 4/1993 | Geier |
| 5,207,239 A | 5/1993 | Schwitalla |
| 5,239,669 A | 8/1993 | Mason et al. |
| 5,255,756 A | 10/1993 | Follmer et al. |
| 5,268,695 A | 12/1993 | Dentinger et al. |
| 5,293,170 A | 3/1994 | Lorenz et al. |
| 5,294,970 A | 3/1994 | Dornbusch et al. |
| 5,296,861 A | 3/1994 | Knight |
| 5,311,149 A | 5/1994 | Wagner et al. |
| 5,323,322 A | 6/1994 | Mueller et al. |
| 5,334,987 A | 8/1994 | Teach |
| 5,343,209 A | 8/1994 | Sennott et al. |
| 5,345,245 A | 9/1994 | Ishikawa et al. |
| 5,359,332 A | 10/1994 | Allison et al. |
| 5,361,212 A | 11/1994 | Class et al. |
| 5,365,447 A | 11/1994 | Dennis |
| 5,369,589 A | 11/1994 | Steiner |
| 5,375,059 A | 12/1994 | Kyrtsos et al. |
| 5,390,124 A | 2/1995 | Kyrtsos |
| 5,390,125 A | 2/1995 | Sennott et al. |
| 5,390,207 A | 2/1995 | Fenton et al. |
| 5,416,712 A | 5/1995 | Geier et al. |
| 5,442,363 A | 8/1995 | Remondi |
| 5,444,453 A | 8/1995 | Lalezari |
| 5,451,964 A | 9/1995 | Babu |
| 5,467,282 A | 11/1995 | Dennis |
| 5,471,217 A | 11/1995 | Hatch et al. |
| 5,476,147 A | 12/1995 | Fixemer |
| 5,477,228 A | 12/1995 | Tiwari et al. |
| 5,477,458 A | 12/1995 | Loomis |
| 5,490,073 A | 2/1996 | Kyrtsos |
| 5,491,636 A | 2/1996 | Robertson |
| 5,495,257 A | 2/1996 | Loomis |
| 5,504,482 A | 4/1996 | Schreder |
| 5,511,623 A | 4/1996 | Frasier |
| 5,519,620 A | 5/1996 | Talbot et al. |
| 5,521,610 A | 5/1996 | Rodal |
| 5,523,761 A | 6/1996 | Gildea |
| 5,534,875 A | 7/1996 | Diefes et al. |
| 5,543,804 A | 8/1996 | Buchler et al. |
| 5,546,093 A | 8/1996 | Gudat et al. |
| 5,548,293 A | 8/1996 | Cohen et al. |
| 5,561,432 A | 10/1996 | Knight |
| 5,563,786 A | 10/1996 | Torii |
| 5,568,152 A | 10/1996 | Janky et al. |
| 5,568,162 A | 10/1996 | Samsel et al. |
| 5,583,513 A | 12/1996 | Cohen |
| 5,589,835 A | 12/1996 | Gildea et al. |
| 5,592,382 A | 1/1997 | Colley |
| 5,596,328 A | 1/1997 | Stangeland |
| 5,600,670 A | 2/1997 | Turney |
| 5,604,506 A | 2/1997 | Rodal |
| 5,608,393 A | 3/1997 | Hartman |
| 5,610,522 A | 3/1997 | Locatelli et al. |
| 5,610,616 A | 3/1997 | Vallot et al. |
| 5,610,845 A | 3/1997 | Slabinski et al. |
| 5,612,883 A | 3/1997 | Shaffer et al. |
| 5,615,116 A | 3/1997 | Gudat et al. |
| 5,617,100 A | 4/1997 | Akiyoshi et al. |
| 5,617,317 A | 4/1997 | Ignagni |
| 5,621,646 A | 4/1997 | Enge et al. |
| 5,638,077 A | 6/1997 | Martin |
| 5,644,139 A | 7/1997 | Allen |
| 5,664,632 A | 9/1997 | Frasier |
| 5,673,491 A | 10/1997 | Brenna et al. |
| 5,680,140 A | 10/1997 | Loomis |
| 5,684,696 A | 11/1997 | Rao et al. |
| 5,706,015 A | 1/1998 | Chen et al. |
| 5,717,593 A | 2/1998 | Gvili |
| 5,725,230 A | 3/1998 | Walkup |
| 5,731,786 A | 3/1998 | Abraham et al. |
| 5,739,785 A | 4/1998 | Allison |
| 5,757,316 A | 5/1998 | Buchler |
| 5,765,123 A | 6/1998 | Nimura et al. |
| 5,777,578 A | 7/1998 | Chang et al. |
| 5,810,095 A | 9/1998 | Orbach et al. |
| 5,828,336 A | 10/1998 | Yunck et al. |
| 5,838,562 A | 11/1998 | Gudat et al. |
| 5,854,987 A | 12/1998 | Sekine et al. |
| 5,862,501 A | 1/1999 | Talbot et al. |
| 5,864,315 A | 1/1999 | Welles et al. |
| 5,864,318 A | 1/1999 | Cosenza et al. |
| 5,875,408 A | 2/1999 | Bendett et al. |
| 5,877,725 A | 3/1999 | Kalafus |
| 5,890,091 A | 3/1999 | Talbot et al. |
| 5,899,957 A | 5/1999 | Loomis |
| 5,906,645 A | 5/1999 | Kagawa et al. |
| 5,912,798 A | 6/1999 | Chu |
| 5,914,685 A | 6/1999 | Kozlov et al. |
| 5,917,448 A | 6/1999 | Mickelson |
| 5,918,558 A | 7/1999 | Susag |
| 5,919,242 A | 7/1999 | Greatline et al. |
| 5,923,270 A | 7/1999 | Sampo et al. |
| 5,926,079 A | 7/1999 | Heine et al. |
| 5,927,603 A | 7/1999 | McNabb |
| 5,928,309 A | 7/1999 | Korver et al. |
| 5,929,721 A | 7/1999 | Munn et al. |
| 5,933,110 A | 8/1999 | Tang |
| 5,935,183 A | 8/1999 | Sahm et al. |
| 5,936,573 A | 8/1999 | Smith |
| 5,940,026 A | 8/1999 | Popeck |
| 5,941,317 A | 8/1999 | Mansur |
| 5,943,008 A | 8/1999 | Van Dusseldorp |
| 5,944,770 A | 8/1999 | Enge et al. |
| 5,945,917 A | 8/1999 | Harry |
| 5,949,371 A | 9/1999 | Nichols |
| 5,955,973 A | 9/1999 | Anderson |
| 5,956,250 A | 9/1999 | Gudat et al. |
| 5,969,670 A | 10/1999 | Kalafus et al. |
| 5,987,383 A | 11/1999 | Keller |
| 6,014,101 A | 1/2000 | Loomis |

| Patent | Date | Name |
|---|---|---|
| 6,014,608 A | 1/2000 | Seo |
| 6,018,313 A | 1/2000 | Engelmayer et al. |
| 6,023,239 A | 2/2000 | Kovach |
| 6,052,647 A | 4/2000 | Parkinson et al. |
| 6,055,477 A | 4/2000 | McBurney et al. |
| 6,057,800 A | 5/2000 | Yang et al. |
| 6,061,390 A | 5/2000 | Meehan et al. |
| 6,061,632 A | 5/2000 | Dreier |
| 6,062,317 A | 5/2000 | Gharsalli |
| 6,069,583 A | 5/2000 | Silvestrin et al. |
| 6,076,612 A | 6/2000 | Carr et al. |
| 6,081,171 A | 6/2000 | Ella |
| 6,100,842 A | 8/2000 | Dreier et al. |
| 6,122,595 A | 9/2000 | Varley et al. |
| 6,128,574 A | 10/2000 | Diekhans |
| 6,144,335 A | 11/2000 | Rogers |
| 6,191,730 B1 | 2/2001 | Nelson, Jr. |
| 6,191,733 B1 | 2/2001 | Dizchavez |
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Ahearn et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,916 B1 | 10/2003 | Miller |
| 6,643,576 B1 | 11/2003 | O'Connor et al. |
| 6,646,603 B2 | 11/2003 | Dooley |
| 6,657,875 B1 | 12/2003 | Zeng et al. |
| 6,671,587 B2 | 12/2003 | Hrovat et al. |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,900,992 B2 | 5/2005 | Kelly et al. |
| 6,922,635 B2 | 7/2005 | Rorabaugh |
| 6,931,233 B1 | 8/2005 | Tso et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,162,348 B2 | 1/2007 | McClure et al. |
| 7,191,061 B2 | 3/2007 | McKay et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altman |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 2001/0025221 A1* | 9/2001 | Klein ........................ 701/209 |
| 2002/0161522 A1* | 10/2002 | Cohen et al. ................ 701/213 |
| 2003/0014171 A1* | 1/2003 | Ma et al. ...................... 701/50 |
| 2003/0187560 A1 | 10/2003 | Keller et al. |
| 2003/0187577 A1* | 10/2003 | McClure et al. ............. 701/213 |
| 2003/0208319 A1* | 11/2003 | Ell et al. ........................ 702/5 |
| 2004/0039514 A1* | 2/2004 | Steichen et al. ............. 701/109 |
| 2004/0212533 A1 | 10/2004 | Whitehead |
| 2005/0055147 A1* | 3/2005 | Hrazdera et al. .............. 701/50 |
| 2005/0080559 A1 | 4/2005 | Ishibashi et al. |
| 2005/0225955 A1 | 10/2005 | Grebenkemper et al. |
| 2005/0265494 A1 | 12/2005 | Goodings |
| 2006/0167600 A1 | 7/2006 | Nelson et al. |
| 2006/0215739 A1 | 9/2006 | Williamson et al. |
| 2007/0078570 A1* | 4/2007 | Dai et al. ........................ 701/1 |
| 2007/0088447 A1 | 4/2007 | Stothert et al. |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |

| | | |
|---|---|---|
| 2008/0204312 A1 | 8/2008 | Euler |
| 2009/0171583 A1 | 7/2009 | DiEsposti |
| 2009/0171597 A1 | 7/2009 | Drews |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |
| 2009/0265101 A1 | 10/2009 | Jow |
| 2009/0265104 A1 | 10/2009 | Shroff |
| 2009/0273372 A1 | 11/2009 | Brenner |
| 2009/0273513 A1 | 11/2009 | Huang |
| 2009/0274079 A1 | 11/2009 | Bhatia et al. |
| 2009/0274113 A1 | 11/2009 | Katz |
| 2009/0276155 A1 | 11/2009 | Jeerage et al. |
| 2009/0295633 A1 | 12/2009 | Pinto et al. |
| 2009/0295634 A1 | 12/2009 | Yu et al. |
| 2009/0299550 A1 | 12/2009 | Baker |
| 2009/0322597 A1 | 12/2009 | Medina Herrero et al. |
| 2009/0322598 A1 | 12/2009 | Fly et al. |
| 2009/0322600 A1 | 12/2009 | Whitehead et al. |
| 2009/0322601 A1 | 12/2009 | Ladd et al. |
| 2009/0322606 A1 | 12/2009 | Gronemeyer |
| 2009/0326809 A1 | 12/2009 | Colley et al. |
| 2010/0013703 A1 | 1/2010 | Tekawy et al. |
| 2010/0026569 A1 | 2/2010 | Amidi |
| 2010/0030470 A1 | 2/2010 | Wang et al. |
| 2010/0039316 A1 | 2/2010 | Gronemeyer et al. |
| 2010/0039318 A1 | 2/2010 | Kmiecik |
| 2010/0039320 A1 | 2/2010 | Boyer et al. |
| 2010/0039321 A1 | 2/2010 | Abraham |
| 2010/0060518 A1 | 3/2010 | Bar-Sever et al. |
| 2010/0063649 A1 | 3/2010 | Wu |
| 2010/0084147 A1 | 4/2010 | Aral |
| 2010/0085249 A1 | 4/2010 | Ferguson et al. |
| 2010/0085253 A1 | 4/2010 | Ferguson et al. |
| 2010/0103033 A1 | 4/2010 | Roh |
| 2010/0103034 A1 | 4/2010 | Tobe et al. |
| 2010/0103038 A1 | 4/2010 | Yeh et al. |
| 2010/0103040 A1 | 4/2010 | Broadbent |
| 2010/0106414 A1 | 4/2010 | Whitehead |
| 2010/0106445 A1 | 4/2010 | Kondoh |
| 2010/0109944 A1 | 5/2010 | Whitehead et al. |
| 2010/0109945 A1 | 5/2010 | Roh |
| 2010/0109947 A1 | 5/2010 | Rintanen |
| 2010/0109948 A1 | 5/2010 | Razoumov et al. |
| 2010/0109950 A1 | 5/2010 | Roh |
| 2010/0111372 A1 | 5/2010 | Zheng et al. |
| 2010/0114483 A1 | 5/2010 | Heo et al. |
| 2010/0117894 A1 | 5/2010 | Velde et al. |
| 2010/0117899 A1 | 5/2010 | Papadimitratos et al. |
| 2010/0117900 A1 | 5/2010 | van Diggelen et al. |
| 2010/0124210 A1 | 5/2010 | Lo |
| 2010/0124212 A1 | 5/2010 | Lo |
| 2010/0134354 A1 | 6/2010 | Lennen |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO2009126587 | 10/2009 |
| WO | WO2009/148638 | 12/2009 |

OTHER PUBLICATIONS

"Orthman Manufacturing Co., www.orthman.com/htm;guidance.htm", *2004*, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers vol. 1, Monetrey, California American Institute of Aeronautics and Astronautics, Inc.*, (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE '09, Jul. 29-31, Chiba*, 1115-1120.

Last, J. D., et al., "Effect of skywave interference on coverage of radiobeacon DGPS stations", *IEEE Proc.-Radar, Sonar Navig.*, vol. 144, No. 3 Jun. 1997, pp. 163-168.

"International Search Report and Written Opinion", PCT/US2004/015678, filed May 17, 2004, mailed Jun. 21, 2005.

"ISO", *11783 Part 7 Draft Amendment 1 Annex, Paragraphs B.6 and B.7.ISO 11783-7 2004 DAM1, ISO: Mar. 8, 2004.*

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

"International Search Report", PCT/US09/479976, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

Takac, Frank et al., "SmartRTK: A Novel Method Of Processing Standardised RTCM Network RTK Information for High Precision Positioning", *Proceedings of ENC GNSS 2008*, Toulouse, France,(Apr. 22, 2008).

"International Search Report", PCT/US09/33567, (Feb. 9, 2009).

"International Search Report and Written Opinion", PCT/IB2008/003796, (Jul. 15, 2009).

"International Search Report,", PCT/US09/34376, (Nov. 02, 2009).

"International Search Report / Written Opinion", PCT/US09/63594, (Jan. 11, 2010).

"International Search Report", PCT/US09/60668 (Dec. 9, 2009).

"International Search Report", PCT/US09/067693, (Jan. 26, 2010).

"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet:,URL: http://gauss.gge.unb.ca/papers.pdf/iongnss2005.rho.wadgps.pdf, (Jul. 12, 2006).

"Eurocontrol, Pegasus Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004),p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004),p. 168 para [0001].

Schaer, et al., "Determination and Use of GPS Differential Code Bias Values", Presentation [online]. Revtrieved May 18, 2010. Retrieved from the Internet: <http://nng.esoc.esa.de/ws2006/REPR2.pdf>, (May 8, 2006).

"International Search Report", PCT/US10/26509, (Apr. 20, 2010).

* cited by examiner

VEHICLE CONTROL SYSTEM

FIELD OF THE INVENTION

The present invention relates to a control system for controlling the direction of travel of a vehicle, and in particular to a control system having an embedded spatial database. The control system of the present invention may also be used to control other aspects of a vehicle's motion, such as speed or acceleration. Furthermore, in the case of agricultural vehicles and the like, the present control system may be used to control yet other aspects of the vehicle's operation, such as the application of agricultural chemicals at desired locations (including at desired application rates), or the engagement and/or mode of operation of agricultural implements (e.g. ploughs, harvesters etc) at desired locations, etc.

For convenience, the invention will be described mainly with reference to agricultural vehicles and like moving agricultural machinery. However, it will be clearly understood that the invention is not limited to agricultural applications and it may equally be applied to vehicles and other moving machinery in other areas.

BACKGROUND

A number of control systems have previously been devised for controlling the steering of agricultural vehicles. These systems are generally used on vehicles such as tractors (including tractors with towed tools or other implements), harvesters, headers and the like which operate in large fields. These vehicles generally move along predetermined trajectories ("paths") throughout the field. In general, a wayline is entered into the control system and subsequent paths are calculated based on the wayline. If the vehicle deviates from the path as it moves, the controller causes the vehicle to steer back towards and onto the path as described below.

As the vehicle moves along the predetermined path trajectory, it uses various means such as signals produced by GPS (global positioning system) or INS (inertial navigation system) to identify if the vehicle deviates from the desired path trajectory. If the vehicle deviates, the extent of the deviation (i.e. the difference between the actual curvature of the vehicle's trajectory and the desired curvature, its actual compass heading compared with the desired compass heading, and the distance the vehicle is displaced laterally from the desired path) is expressed in the form of an error, and this error is fed back into the control system and used to steer the vehicle back onto the desired path.

A problem with previous vehicle control systems is that they are inherently "one-dimensional" or "linear" in nature. This means that, at a fundamental level, the controller operates by "knowing" the path that the vehicle is required to traverse, and "knowing" where the vehicle is located on that path (i.e. how far along the path the vehicle has moved) at a given time. However, the controller does not "know" where the vehicle is actually located in space. This is despite the fact that the controller may often progressively receive information containing the vehicle's spatial location, for example from the GPS/INS signals. In current controllers, the GPS/INS signals are used primarily to determine when the vehicle deviates from the path (i.e. to calculate the error) rather than for the primary purpose of determining the vehicle's actual position in space. Hence, at a fundamental level, the controller only "knows" the geometry of the path and how far the vehicle has moved along the path.

Therefore, with current controllers, if it is desired to know the actual spatial position of the vehicle, this must be calculated from the known geometry of the path and the known distance the vehicle has moved along that path. This calculation can be computationally expensive and difficult to implement in practice, particularly for curved, piecewise, broken or other complex path trajectories.

By way of example, it will be appreciated that one form of common path trajectory that agricultural vehicles are often required to traverse in fields is made up of a number of (usually parallel) path segments or "swaths" (these are sometimes also referred to as "rows"). Thus, the vehicle typically moves along one swath, harvesting or ploughing as it goes, and it then turns around and moves back along an adjacent parallel swath, harvesting or ploughing in the opposite direction. The adjacent swath will generally be spaced from the first swath sufficiently closely that no part of the field or crop is missed between the swaths, but also sufficiently apart so that there is not an unnecessary overlap region (i.e. a region between the swaths that gets ploughed or harvested on both passes). In general, the distance between the mid-lines of each respective swath is determined with reference to the width of the vehicle (i.e. the width of the plough, harvester or possibly the tool being towed by the vehicle).

In cases where paths comprising a series of parallel swaths are used, the first swath will often be used as a reference swath or "wayline". In general, the geometry of the wayline in space will be entered into the control system along with the vehicle or implement width, and this is used to calculate the required spacing (and hence trajectory) for each of the adjacent parallel swaths. However, with most existing control systems, the controller is only able to control the steering of the vehicle as it proceeds along each of the swaths. It is much harder to control the steering of the vehicle as it turns around between one swath and the next. Therefore, whilst the spatial geometry of the respective swaths may have been calculated, from the control system's point of view at any given time it only "knows" that it is on the nth swath (numbered from the wayline) and that it has been moving along that swath for a known amount of time with known speed (i.e. it knows that the vehicle is a certain distance along the nth swath). However, at a fundamental level, the control system does not inherently know where the vehicle is consequently located in space or the spatial relationship between each swath. A graphical representation of the difference between the vehicle's actual spatial location and what the control system "sees" is given in FIG. 1.

The "one-dimensional" or "linear" nature of existing control systems also causes other difficulties. One example is in relation to obstacle avoidance. In most agricultural applications, the positions of obstacles (e.g. fences, trees, immovable rocks, creeks etc) are known according to their "real-world" spatial location. The spatial location may be known according to global latitude and longitude coordinates (e.g. as provided by GPS), or alternatively the location may be known relative to a fixed point of known location (this is generally a point in or near the field used to define the origin of a coordinate system for the field). However, as current control systems only recognise where the vehicle is located along the path, not where the vehicle is actually located in space, the control system itself is therefore unable to recognise whether the location of the obstacle coincides with the trajectory of the path, and hence whether there may be a collision.

Consequently, with current control systems, it may be necessary for a number of separate modules to be provided, in addition to the primary control module, if automatic obstacle avoidance (i.e. obstacle avoidance without the need for intervention by the driver of the vehicle) is to be achieved. In these cases, one of the modules would be a collision detection module for calculating the geometry and trajectory of a section of the path a short distance ahead of the vehicle in terms of "real world" spatial coordinates and for determining whether any of the points along that section of path will coincide with the location of an obstacle. If the collision detection module identifies that the section of path is likely to pass through an obstacle (meaning that there would be a collision if the vehicle continued along that path), then a further module may be required to determine an alternative trajectory for (at least) the section of the path proximate the obstacle. Yet a further module may then be required to determine how best to steer the vehicle from the alternative trajectory back onto the original path after the vehicle has moved past the obstacle. This multi-modular control system structure is complicated and can lead to computational inefficiencies because the different modules may each perform many of the same geometric calculations for their own respective purposes, separately from one another, leading to "doubling up" and unnecessary computation. Also, with this modular control system structure, control of the vehicle generally passes from one module to another as described above, but determining when one module should take over from another creates significant difficulties in terms of both system implementation and maintenance.

Another problem associated with the "one-dimensional" nature of existing control systems is their inherent inflexibility and unadaptability. For example, in practice, if the vehicle deviates from the desired path for some reason, it may be preferable for subsequent paths (swaths) to also include a similarly shaped deviation so that the paths remain substantially parallel along their length (or tangentially parallel and consistently spaced in the case of curved sections of path). If the vehicle is, for example, a harvester or a plough, then keeping the paths parallel in this way may help to prevent portions of the field from being missed, or from being harvested/ploughed multiple times (by passing over the same portion of field on multiple passes). Even with the modular control system structures described above, it is often difficult to determine the geometry of the deviated path portion in terms of "real world" coordinates, and even if this can be done, it is also difficult to adjust subsequent path geometries to correspond to the deviation from the predetermined path trajectory that was originally entered.

As a further example of the inherent inflexibility and unadaptability of current "one-dimensional" control systems, it is illustrative to consider the situation where an obstacle is located near the end of one swath such that it would be quicker and more efficient to simply move on to an adjacent swath located nearby rather than wasting time trying to go around the obstacle to finish the first swath before moving on to the adjacent swath. Current "one-dimensional" control systems are not able to recognise that it would be more efficient to move on. This is because the control system only knows where the vehicle is along its current path (e.g. close to the end of the swath), and if a modular control systems is used, that module may also recognise that it is approaching the obstacle. The control system does not know where the vehicle is actually located in space, and therefore it cannot recognise that the beginning of the next swath is actually located nearby—it simply does not know where the next swath is (or indeed where the current swath is in space). Therefore, current control systems cannot easily recognise when it would be better to change paths (at least without intervention from the vehicle's driver), as this example illustrates. Nor is the current "one-dimensional" structure inherently adapted to enable the control systems to automatically (i.e. autonomously without assistance from the driver) determine and guide the vehicle along an efficient trajectory between swaths.

It will be clearly appreciated that any reference herein to background material or a prior publication is not to be understood as an admission that any background material, prior publication or combination thereof forms part of the common general knowledge in the field, or is otherwise admissible prior art, whether in Australia or any other country.

DESCRIPTION OF THE INVENTION

It is an objective of the present invention to provide a vehicle control system having an embedded spatial database that may at least partially ameliorate one or more of the above-mentioned difficulties, or which may provide a useful or commercial alternative to existing control systems.

Accordingly, in a first broad form the present invention resides in a vehicle control system having a controller and a spatial database adapted to provide spatial data to the controller at control speed.

In another broad form, the invention resides in a control system for controlling a vehicle within a region to be traversed, the control system comprising
a spatial database containing spatial data,
a controller adapted to receive spatial data from the spatial database at control speed,
the control system being adapted to receive spatial data from the controller and/or an external source,
the controller using the spatial data for controlling the vehicle.

In a further broad form, a control system is provided for steering a vehicle within a region to be traversed, the control system comprising
a spatial database containing spatial data,
a controller adapted to receive spatial data from the spatial database at control speed,
the controller being adapted to control the steering of the vehicle,
the spatial database being adapted to receive updated spatial data from the controller and/or an external source,
the updated spatial data relating to the vehicle and/or an implement associated with and proximate the vehicle and/or at least a portion of the region proximate the vehicle.

In agricultural applications, the region to be traversed by the vehicle will generally be the field that is to be ploughed, harvested, etc, and the invention will be described generally with reference to agricultural vehicles operating in fields. However, no limitation is meant in this regard, and the region to be traversed by the vehicle may take a range of other forms in different applications. For example, in automotive applications the region to be traversed by the vehicle might comprise roadways located in a particular geographical area. Alternatively, in mining applications the region could comprise the vehicle navigable regions of the mine. In underground mining, this could include the various levels of the mine located vertically above and below one another at different relative levels (depths). Furthermore, the control system of the present invention could be applied to vehicles that operate on airport tarmacs, in which case the region to be traversed by the vehicle might be the tarmac, or a portion thereof. From these examples, the person skilled in the art will appreciate the breadth of other applications that are possible.

The control system of the present invention includes a spatial database that contains spatial data. The spatial database may also be adapted to receive spatial data including updated spatial data, and to provide spatial data to other components of the control system. In general, data may be characterised as "spatial" if it has some relationship or association with "real world" geographical location, or if it is stored somehow with reference to geographical location. Some illustrative examples of the kinds of spatial data that may be stored within the database include (but are not limited to) coordinate points describing the location of an object (e.g. a rock or tree) in terms of the object's "real world" geographical location in a field, the coordinate points for a geographical location itself, information regarding a "state" of the vehicle (e.g. its speed, "pose" (position and orientation) or even fuel level) at a particular geographical location, a time when the vehicle was at a particular geographical location, or a command to the vehicle to change its trajectory or mode of equipment (e.g. plough) operation if or when it reaches a certain geographical location. These examples illustrate that any data or information that has an association with geographical location, or which is stored with reference to geographical location, can constitute "spatial data". For the remainder of this specification, the terms "spatial data" and "spatial information" will be used interchangeably. References simply to "data" or "information" will generally also carry a similar meaning, and references simply to the "database" will be to the spatial database, unless the context requires otherwise. Typically, the spatial database is an electronic database stored in a memory device, such as, for example, a RAM, as discussed in more detail below.

Spatial data may be stored within the database according to any convenient coordinate system, including (but not limited to) cartesian (or projected) coordinates, polar coordinates, cylindrical coordinates, spherical coordinates, latitude/longitude/altitude etc. The coordinate system may also be "global" in the sense of the location references provided by GPS, or "local" coordinates such as those defined with respect to a local origin and reference orientation. The coordinates may or may not take into account the curvature caused by the Earth's overall spherical shape. Hence, there is no limitation as to the coordinate system that may be used with the present invention, although it is envisaged that Cartesian (x,y or x,y,z) coordinates or latitude/longitude/altitude will be used most frequently because of the way these inherently lend themselves to describing geographical location, and because of the ease with which these coordinate systems can be implemented digitally. Particularly representative embodiments may utilise the WGS84 datum which is consistent with the current GPS.

Those skilled in the art will know that GPS (global positioning system) is the name of the satellite based navigation system originally developed by the United States Department of Defense. GPS is now used in a wide range of applications. A number of systems also exist for increasing the accuracy of the location readings obtained using GPS receivers. Some of these systems operated by taking supplementary readings from additional satellites and using these supplementary readings to "correct" the original GPS location readings. These systems are commonly referred to as "Satellite Based Augmentation Systems" (SBAS) and some examples of SBASs are:

The United States'"Wide Area Augmentation System" (WAAS),
The European Space Agency's "European Geostationary Navigation Overlay Service" (EGNOS), and
The Japanese' "Multi-Functional Transportation Satellite" (MFTS)

A number of "Ground Based Augmentation Systems" (GBASs) also exist which help to increase the accuracy of GPS location readings by taking additional readings from beacons located at known locations on the ground. It will be understood that, throughout this specification, all references to GPS include GPS when augmented by supplementary systems such as SBASs, GBASs and the like.

It is explained above that the controller (which controls the vehicle) receives spatial data from the spatial database. In this way, the data received by the controller from the database forms at least part of the control inputs that the controller operates on to control the vehicle (i.e. the spatial data forms at least part of the inputs that drive the controller). The fact that the controller operates directly on information that is inherently associated with "real world" geographic location represents a change in thinking compared with existing vehicle control systems. In particular, it means that the control system of the present invention "thinks" directly in terms of spatial location. Put another way, in the control system of the present invention, control parameters are defined in geographic space rather than the space of an abstract vector. Consequently, the controller of the present invention may be considered to be inherently "multi-dimensional" or "spatial" in nature, as opposed to "one-dimensional" or "linear" like the existing control systems described in the background section above.

It is envisaged that at least some (and probably most) of the components of the control system, including the controller, will typically be implemented using commercially available equipment and a generally conventional control architecture. For instance, the controller may be implemented using equipment that provides memory and a central processing unit to run the one or more algorithms required to control the vehicle. Likewise, the controller (and hence the control algorithm(s)) used in the present invention may take any form suitable for controlling the steering of a vehicle. Typically, closed loop or feedback type control will be used at least in relation to some signal streams (i.e. in relation to at least some of the vehicle variables being controlled by the controller). However, open loop control may also be used, as may feed-forward control structures wherein the spatial data received by the controller from the spatial database is fed forward to form part of the control outputs used to control the vehicle. Where feedback type control is used, the control structure may incorporate combinations of proportional, integral and differential control, or a series of such (possibly nested) control loops. However, no particular limitation is meant in this regard and the person skilled in the art will appreciate that any form of suitable control and/or controller may be used.

The control system may also incorporate conventional signal processing and transmitting equipment, for example, for suitably filtering incoming spatial data signals, and for transmitting control signals from the controller to the vehicle's steering system to steer the vehicle. The person skilled in the art will appreciate that any suitable electric, mechanical, pneumatic or hydraulic actuators, or combinations thereof, may be used with the present invention. The actuators may be linked with the vehicle's steering and drive systems to control the steering, acceleration, deceleration etc of the vehicle in response to control signals produced by the controller. Associated equipment such as amplifiers and power sources may also be provided as required to amplify the control signals, and to power the actuators. A wide range of power sources may be used including batteries, generators, pumps etc depending on the nature of the actuator(s) and the signals to be amplified.

Whilst the present control system may operate using a conventional form of controller and using at least some commercially available equipment, the spatial database used to store the spatial data and to provide the spatial data to the controller may be different to other forms of databases used in other areas. In other areas (including non-control related applications such as those where data storage is the principal objective), databases often contain the vast amounts of information (in this case "information" is not used in its "spatial" sense) and the information is generally stored in complex hierarchical structures. Conceptually, these databases may be considered to be "multi-levelled" in that an initial query may return only relatively superficial level information, but this may in turn allow the user to interrogate the database more deeply to obtain more specific, linked or related information. This complex structure means that these kinds of databases can take considerable time (many seconds, minutes or even longer) to generate the appropriate output in response to a query. Those skilled in the art will appreciate that databases such as these, which take a relatively long time to return information in response to a query, may not be suitable for use in control systems such as the present which require low latencies between variable inputs and control outputs to thereby enable real-time control to be provided.

The spatial database used in the present invention will suitably be adapted to provide the data to the controller at control speed. In this sense, "control speed" means that the database is able to provide the information at a rate of the same order as the speed at which the controller repeats successive cycles of the control algorithm (i.e. at a rate of the same order as the "clock speed" of the controller). Ideally, the database will be adapted to provide the data to the controller, and perhaps also receive data from the controller and/or external sources, at every successive cycle of the control algorithm (i.e. at the controller's clock speed). However, in some embodiments it may be sufficient for the database to be adapted to provide (and perhaps receive) data at less than, but close to, the controller's clock speed (for example, at every second or third successive cycle of the control algorithm), provided that the rate is fast enough to provide the controller with sufficiently up-to-date spatial information to achieve adequate vehicle control performance. In cases where the controller operates at different clock speeds for different data signal streams, the database may be adapted to provide data at a rate of the same order as one of those controller clock speeds. In any event, the database should provide data to the controller at a rate commensurate with the control loop bandwidth.

In practice, it is envisaged that the database may be adapted to provide data to the controller at a rate of between 1 Hz and 100 Hz. Given the speeds that vehicles such as agricultural vehicles typically move at (generally less than 60 km/hr or 37.3 miles/hr), rates between 1 Hz and 20 Hz will almost always be sufficient, and even rates between 3 Hz and 12 Hz may be sufficient for vehicles moving at significantly less than 60 km/hr. Nevertheless, those skilled in the art will recognise that the necessary or achievable rates may vary depending on the level of control precision and performance required in different applications, the speed at which the vehicle in question moves, and the capabilities of the available equipment used to implement the control system.

Those skilled in the art will appreciate that because the spatial database used in the present invention can provide spatial data to the controller at control speed, and therefore forms part of the system's overall configuration, the spatial database may be considered to be "embedded" within the control system, rather than external to it. This is particularly so in embodiments where feedback type control is used, and the spatial database forms part of the system's overall closed loop structure (i.e. in embodiments where the spatial database forms part of the loop).

In order for the database to be able to provide (and, if desired, also receive) data at the required rates, the form of the database should allow the required rapid database access and response times. Ideally, the database and all of the data that it contains will be loaded into the control system's memory (i.e. loaded into RAM). This way, the data will be directly accessible by the controller's CPU (central processing unit), rather than requiring a query to be sent to a remote disk or storage device containing the data, the response to which would then need to be loaded into RAM before being accessible by the CPU. However, it is possible that the database could be located on a separate disk or other storage device, particularly if the device is capable of retrieving data in response to a query with sufficient speed such as, for example, a disk device with RAM read/write cache.

It is envisaged that the amount of memory required to store the spatial data relating to a particular field to be traversed by the vehicle may be in the order of megabytes. By way of example (given for illustrative purposes only), consider a straight wayline that is 1 km long and which has 500 parallel swaths of corresponding length. If the database is designed to incorporate information pertaining to locations every 2 m along each of the 500 swaths, this corresponds to 501×500=250,500 locations. When the data is structured within the database in the manner described further below, this may correspond to approximately 4 MB of memory required to store the coordinates of each point. However, it is also envisaged that as the nature and complexity of the data required to be stored in the database increases, the required amount of memory may increase to hundreds of megabytes or gigabytes. Devices which provide this amount of memory are (or are at least becoming) commercially available.

The speed of the database may be assisted by the way in which the data is arranged (i.e. stored) within the database. A wide range of methods and algorithms are known for arranging data (i.e. for assigning appropriate "indices" and the corresponding memory allocations to individual items of data) within databases, and the particular method chosen depends on the nature of the data, and the way and speed with which the database is to respond to a query. For the complex hierarchical "multi-levelled" databases described above, the data should be arranged so as to enable the database to collate and deliver all relevant information relating to a complex query. However, as explained above, the requirement for those databases to be able to process complex queries leads to potentially long lag times which may be undesirable in the context of vehicle control applications. Therefore, the spatial database used in the present invention can store data in a "single-level" or "flat" structure according to the geographical location that particular items of data relate to.

Some algorithms which could be used to arrange the spatial data within the database include the algorithms commonly referred to by the names "Grid-indexing", "Quadtree" or "R-tree". However, in other embodiments of the invention data may be arranged within the database using a form of algorithm that will be referred to as a "spatial hash-key" algorithm. A spatial hash-key algorithm maps physical locations (based on their "real world" coordinates) into one-dimensional "hash-keys". The "hash-key" for each location is a string of characters that can be stored in the database's hash table and retrieved in response to a query.

Properties of the spatial hash-key algorithm may include:
points which are close to each other in the real world should have closely related hash keys (i.e. the algorithm should maintain "locality"), the algorithm should operate using whatever coordinate system the control system uses to represent the region, the algorithm should be adapted for digital implementation (hence, it should be adapted to operate using integer or floating-point numbers, preferably with 64-bit "double" precision or better)

the algorithm should be fast to compute.

It is explained above that the control system of the present invention, and ideally the spatial database, may be adapted to receive updated data from the controller and/or an external source. The spatial database can be adapted to receive the updated information at control speed. Data received from the controller may include or may be used to generate, for example, estimates of the vehicle's predicted state (i.e. its speed, position, orientation etc) at an upcoming location based on its current instantaneous state at a particular location. The external sources may include GPS, INS, or any other inertial, visual or other system used for obtaining information relating to the state of the vehicle or other aspects of the region (such as obstacles close to the vehicle). Data received in this way may be (at least initially) recorded in its unprocessed or "raw" form in the database. This unprocessed data may be fed directly back into the controller, or the respective streams of incoming data (possibly relating to disparate variables) may be filtered using a Kalman filter or some other similar digital signal processing technique to obtain a statistically optimised estimate of the state of the vehicle and its proximate surroundings as it travels. This optimised estimate of the vehicle's state at a particular location may then be fed into the controller. The use of statistically optimised estimates and data may help to improve control performance.

According to a further broad form, the invention resides in a closed loop vehicle control system comprising a spatial database, a controller adapted to receive spatial data from the spatial database at control speed, the controller controlling the steering of the vehicle, wherein updated spatial data is fed back into the control system.

In yet another broad form, the invention resides in a method for controlling a vehicle comprising entering spatial data relating to a region to be traversed by the vehicle into a spatial database, providing spatial data from the spatial database to a controller at control speed to control the vehicle as the vehicle traverses the region, and entering updated spatial data into the spatial database as the vehicle traverses the region.

In yet a further broad form, the invention resides in a vehicle control system comprising a spatial database, a controller adapted to receive spatial data from the spatial database, the controller using the spatial data from the spatial database to control the steering of the vehicle.

It will be appreciated that all preferred features and aspects of the invention described with particular reference to one or other broad form of the invention, may also apply equally to all other forms of the invention, unless the context dictates otherwise.

BRIEF DESCRIPTION OF THE DRAWINGS

Certain embodiments, aspects and features of the invention will now be described and explained by way of example and with reference to the drawings. However, it will be clearly appreciated that these descriptions and examples are provided to assist in understanding the invention only, and the invention is not limited to or by any of the embodiments, aspects or features described or exemplified.

BEST MODE

Figure 1:
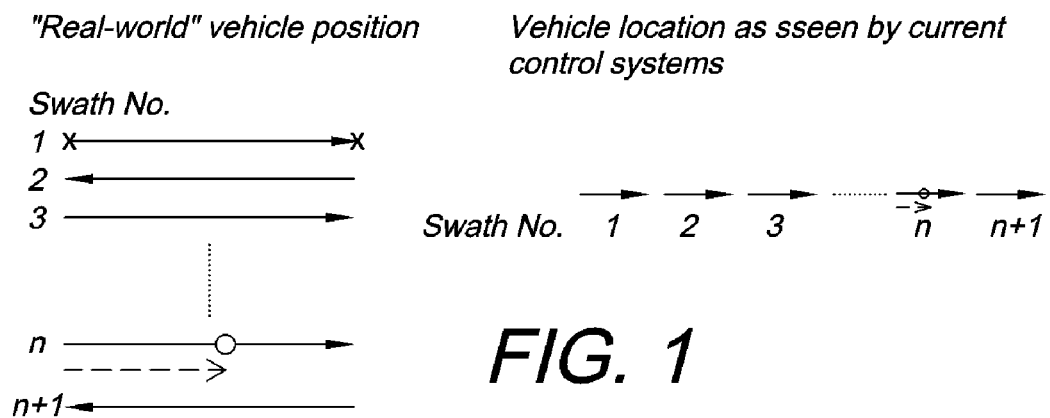
FIG. 1 schematically represents the difference between the vehicle's actual spatial location and what is "seen" by existing forms of "one-dimensional" controllers such as those described in the background section above.

As described in the background section above, one of the problems with existing vehicle control systems is that they are inherently "one-dimensional" or "linear" in nature. The inherent "linear" nature of existing control systems is illustrated schematically in FIG. 1. Whilst the "real world" spatial geometry of the respective swaths shown on the left in FIG. 1 may have been calculated, nevertheless from the control system's point of view at any given time the controller only "knows" that the vehicle is on the nth swath and that it has been moving along that swath for a known amount of time with known speed. Hence, at a fundamental level, the controller does not inherently know where the vehicle is located in space. This is represented graphically in FIG. 1.

Figure 2:
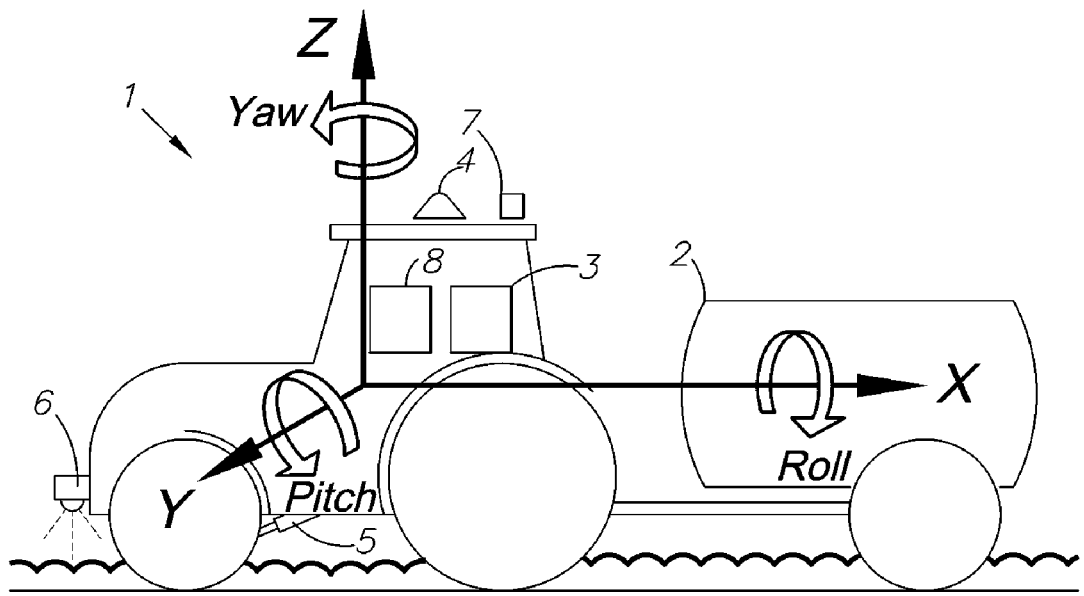
FIG. 2 is a pictorial representation of an agricultural vehicle having a control system in accordance with one particular embodiment of the present invention.

Next, FIG. 2 shows an agricultural vehicle 1 having a control system in accordance with one embodiment of the present invention. In FIG. 2, the agricultural vehicle 1 is a tractor towing an implement 2. The implement 2 could be a plough, harvester, seed sower, leveller, agricultural chemical applicator/dispenser or any other kind of agricultural implement. Furthermore, the embodiment of the invention shown in FIG. 2 could equally be applied on other kinds of vehicles operating in other areas, for example cars, mine-trucks, airport tarmac vehicles, etc.

The components of the control system in the particular embodiment shown in FIG. 2 include a main control unit 3, a GPS antenna 4 and actuators 5. The main control unit 3 houses the spatial database and also the electronic hardware used to implement the controller. The main control unit 3 may be an industrial computer (for example an industrial PC) capable of running other applications in addition to the vehicle control system. Alternatively, the main control unit 3 may be a purpose-built unit containing only the hardware required to run the controller, the spatial database and the other components of the vehicle control system.

The main control unit 3 receives GPS signals from the GPS antenna 4, and it uses these (typically in combination with feedback and/or other external spatial data signals) to generate a control signal for steering the vehicle. The control signal will typically be made up of a number of components or streams of data relating to the different parameters of the vehicle being controlled, for example the vehicle's "cross-track error", "heading error", "curvature error", etc. These parameters will be described further below. The control signal is amplified using suitable signal amplifiers (not shown) to create a signal that is sufficiently strong to drive the actuators 5. The actuators 5 are interconnected with the vehicle's steering mechanism (not shown) such that the actuators operate to steer the vehicle as directed by the control signal.

In some embodiments, further actuators (not shown) may also be provided which are interconnected with the vehicle's accelerator and/or braking mechanisms, and the control signal may incorporate components or signal streams relating to the vehicle's forward progress (i.e. its forward speed, acceleration, deceleration etc). In these embodiments, the component(s) of the control signal relating to the vehicle's forward progress may also be amplified by amplifiers (not shown) sufficiently to cause the actuators which are interconnected with the accelerator/braking mechanism to control the vehicle's acceleration/deceleration in response to the control signal.

The vehicle 1 may also be optionally provided with one or more visual sensors 6, one or more inertial sensors 7 and a user terminal 8. One form of visual sensor 6 that may be used may operate by receiving images of the ground beneath the vehicle, preferably in rapid succession, and correlating the data pertaining to respective successive images to obtain information relating to the vehicle's motion. Other forms of visual sensor may also be used including LIDAR (Light Detection and Ranging) or sensors which operate using machine vision and/or image analysis. If present, the one or more inertial sensors 7 will typically include at least one gyroscope (e.g. a rate gyroscope), although the inertial sensors 7 could also comprise a number of sensors and components (such as accelerometers, tilt sensors and the like) which together form a sophisticated inertial navigation system (INS). The vehicle may be further provided with additional sensors (not shown) such as sensors which receive information regarding the location of the vehicle relative to a fixed point of known location in or near the field, magnetometers, ultrasonic range and direction finding and the like. The data generated by these additional sensors may be fed into the database and used by the control system to control the vehicle as described below.

In embodiments where the main control unit 3 comprises an industrial PC or the like, the user terminal 8 may comprise a full computer keyboard and separate screen to enable the user to utilise the full functionality of the computer. However, in embodiments where the main control unit is a purpose-built unit containing only hardware relating to the vehicle's control system, the terminal 8 may comprise, for example, a single combined unit having a display and such controls as may be necessary for the user to operate the vehicle's control system. Any kind of controls known by those skilled in this area to be suitable may be used on the main control unit, including keypads, joysticks, touch screens and the like.

In FIG. 2, the user terminal 8 is positioned in the vehicle cabin so that it can be operated by the driver as the vehicle moves. However, those skilled in the art will recognise that the present control system could also be operated by wireless remote control, meaning that the user terminal 8 could alternatively be totally separate from the vehicle and could operate the vehicle's control system from a remote location. It is also envisaged that a single remote user terminal 8 may be used to wirelessly interface with the control systems of multiple vehicles (possibly simultaneously) so that the user can control multiple moving vehicles from the one remote terminal.

Figure 3:
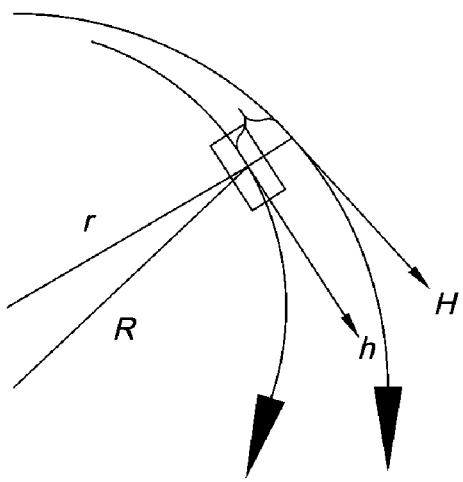
FIG. 3 illustrates the physical meaning of certain parameters controlled by some versions of the present control system, namely the "cross-track error", the "heading error" and the "curvature error"

In order to control the steering of the vehicle, there are three parameters that should be controlled. These are the "cross-track error", the "heading error" and the "curvature error". The physical meaning of these parameters can be understood with reference to FIG. 3. The "cross-track error" is the lateral difference between the vehicle's actual position, and its desired position. This is illustrated by the "{" bracket in FIG. 3. The "heading error" is the difference between the vehicle's actual instantaneous direction of motion h (i.e. its actual compass heading), and its desired instantaneous direction of motion H. The heading error is given by:

Heading Error=$H$-$h$

Those skilled in the art will recognise that both h and H are inherently directional quantities.

Finally, the "curvature error" is the difference between the actual instantaneous radius of curvature r of the vehicle's motion and the desired instantaneous radius of curvature R. The curvature error is given by:

Curvature Error=$1/R$-$1/r$

It will also be clearly appreciated that there may be many other vehicle variables or parameters which also need to be controlled if, for example, acceleration/deceleration or the vehicle's mode of equipment operation are also to be controlled.

Figure 4:
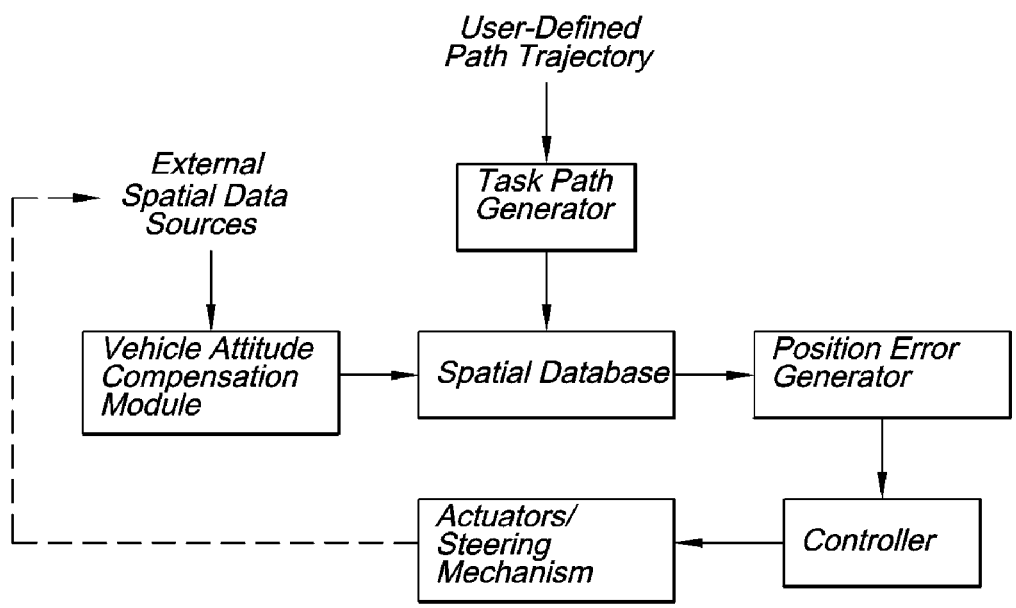
FIG. 4 is a schematic "block-diagram" representation of an overall control system structure that may be used in representative embodiments of the present invention.

Referring next to FIG. 4, it can be seen that a vehicle control system in accordance with one particular embodiment of the invention comprises:

- a task path generator,
- a spatial database,
- at least one external spatial data source,
- a vehicle attitude compensation module,
- a position error generator,
- a controller, and
- actuators to control (steer) the vehicle.

In the overall operation of the control system, the desired path trajectory for the vehicle is first entered into the control system by the user via the user terminal 8. The task path generator then interprets this user-defined path definition and converts it into a series of points of sufficient spatial density to adequately represent the desired path to the requisite level of precision. The task path generator typically also defines the vehicle's desired trajectory along the user-defined path, for example, by generating a desired vehicle position, a desired heading H and a desired instantaneous radius of curvature R for each point on the path. This information is then loaded into the spatial database. The way in which this and other spatial information is stored within the database in representative embodiments, and in particular the way in which pieces of data are given memory allocations according to their spatial location, is described further below.

As the vehicle moves along the user-defined path, it will invariably experience various perturbations in its position and orientation due to, for example, bumps, potholes, subsidence beneath the vehicle's wheels, vehicle wheel-spin, over/understeer etc. Those skilled in this area will recognise that a huge range of other similar factors can also influence the instantaneous position and orientation of the vehicle as it moves. One of the purposes of the present control system is to automatically correct for these perturbations in position and orientation to maintain the vehicle on the desired path (or as close to it as possible).

As the vehicle moves, the control system progressively receives updated information regarding spatial location from the external spatial data sources. The external spatial data sources will typically include GPS. However, a range of other spatial data sources may also be used in addition to, or in substitute for GPS. For example, the inertial navigation systems (INS), visual navigation systems etc described above may also be used as external data sources in the present control system.

Those skilled in the art will recognise that the spatial data collected by the external spatial data sources actually pertains to the specific location of the external spatial data receivers, not necessarily the vehicle/implement reference location itself (which is what is controlled by the control system). In FIG. 2, the reference location is on the vehicle 1 and is indicated by the intersection (i.e. the origin) of the roll, pitch and yaw axes. In other embodiments, the reference location may be located elsewhere on the vehicle, or on the implement 2 etc. In any event, to illustrate this point, it will be seen that the GPS antenna 4 in FIG. 2 is located on the roof of the vehicle some distance from the vehicle's reference point. Therefore, the spatial data collected by the GPS antenna actually relates to the instantaneous location of the vehicle's roof, not the location of the vehicle's reference point. Likewise, the spatial data collected by the visual sensor 6 actually pertains to the particular location of the visual sensor (slightly out in front of the vehicle in FIG. 2).

In addition to this, changes in the vehicle's attitude will also influence the spatial position readings received by the different receivers. For example, if one of the vehicle's wheels passes over, or is pushed sideways by a bump, this may cause the vehicle to rotate about at least one (and possibly two or three) of the axes shown in FIG. 2. This will in turn change the relative position of the spatial data receiver(s) such as GPS antenna 4 with respect to the reference location on the vehicle or implement. This can be used (typically in combination with other sources of external spatial data or "feedback" data) to determine the orientation of the vehicle. The orientation of the vehicle may be considered to be the relative orientation of the vehicle's axes in space.

In order to compensate for the difference in position between the vehicle's reference point and the location of the spatial data receiver(s), and also to account for changes in the vehicle's orientation, a vehicle attitude compensation module is provided. This is shown in FIG. 4. The vehicle attitude compensation module converts all readings taken by the various spatial data receivers (which relate to the different specific locations of the receivers) into readings pertaining to the spatial location and orientation of the vehicle's reference point. This data pertaining to the spatial location and orientation of the vehicle's reference point is then fed into the spatial database.

Those skilled in the art will recognise that the one or more external spatial data sources will progressively receive updated data readings in rapid succession (e.g. in "real time" or as close as possible to it). These readings are then converted by the vehicle attitude compensation module and fed into the spatial database. The readings may also be filtered as described above. Therefore, whilst each reading from each spatial data source is received, converted (ideally filtered) and entered into the spatial database individually, nevertheless the rapid successive way in which these readings (possibly from multiple "parallel" data sources) are received, converted and entered effectively creates a "stream" of incoming spatial data pertaining to the vehicle's continuously changing instantaneous location and orientation. In order to provide sufficient bandwidth, successive readings from each external spatial data source should be received and converted with a frequency of the same order as the clock speed (or at least one of the clock speeds) of the controller, typically 3 Hz-12 Hz or higher.

Referring again to FIG. 4, the position error generator next receives information from the spatial database. The information it receives from the database includes:

the vehicle's desired position, heading H and instantaneous radius of curvature R. It will be recalled that this information is originally generated by the task path generator and then entered into the spatial database, based on the user-defined path trajectory.

And the vehicle's actual position, heading h and instantaneous radius of curvature r. This information is based on spatial data progressively received from the external spatial data sources as described above, and typically also on data received through feedback.

The position error generator then uses this information to calculate an instantaneous "error term" for the vehicle. The "error term" incorporates the vehicle's instantaneous cross-track error, heading error and curvature error (as described above). The error term is then fed into the controller. The controller is shown in greater detail in FIG. 5.

Figure 5:
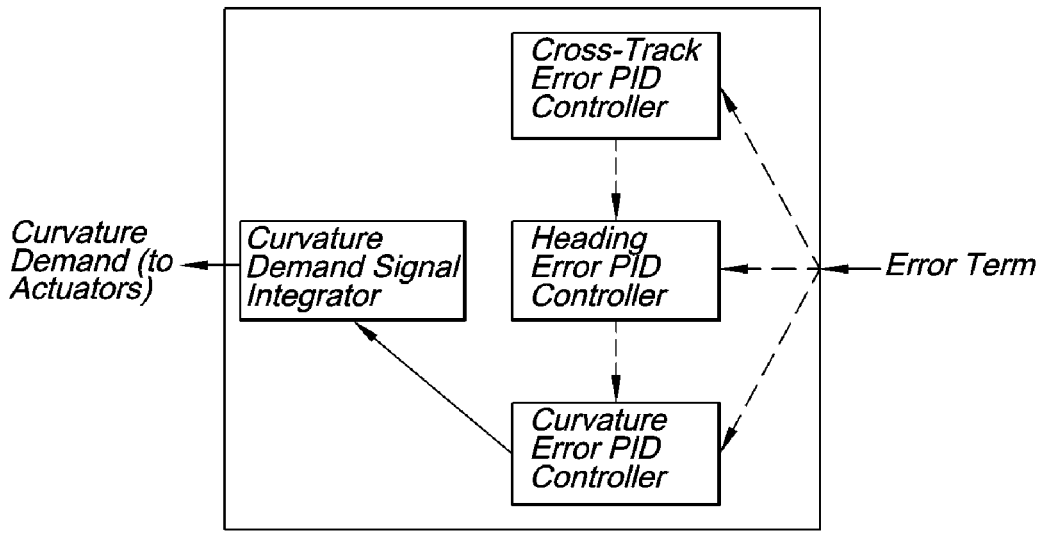
FIG. 5 is a schematic representation of the "controller" block that may be used in representative embodiments such as that shown in FIG. 4.

From FIG. 5 it can be seen that the controller incorporates a cross-track error PID controller, a heading error PID controller and a curvature error PID controller. The PID controllers used with the present invention are of a conventional form that will be well understood by those skilled in this area and need not be described in detail. The output from the cross-track error, heading error and curvature error PID controllers then passes through a curvature demand signal integrator. The output from the PID controllers is therefore integrated in order to generate a curvature demand signal. This curvature demand signal is thus the "control signal" which is amplified by amplifiers (not shown) before proceeding to drive the actuators as required. In other words, the signal obtained by integrating the output from the PID controllers is amplified and sent to the actuators in the form of a curvature demand to change the vehicle's steering angle and hence steer the vehicle back onto the desired path. Finally, the change in vehicle pose etc caused by the control driven change in steering angle is registered via the updated information received through the external data sources (GPS etc) and the vehicle's new position, heading and instantaneous radius of curvature are re-entered into the spatial database to complete control system's overall closed loop control structure. It will be noted that the arrows extending from the actuators/steering mechanism to the external data sources in FIG. 4 are dashed rather than solid lines. This is to indicate that, whilst there is no actual control signal or other data flow from the actuators/steering mechanism to the external data sources, there is nevertheless a causal link between the change in vehicle pose etc caused by the control driven change in steering angle and the updated information received through the external data sources.

Figure 6:
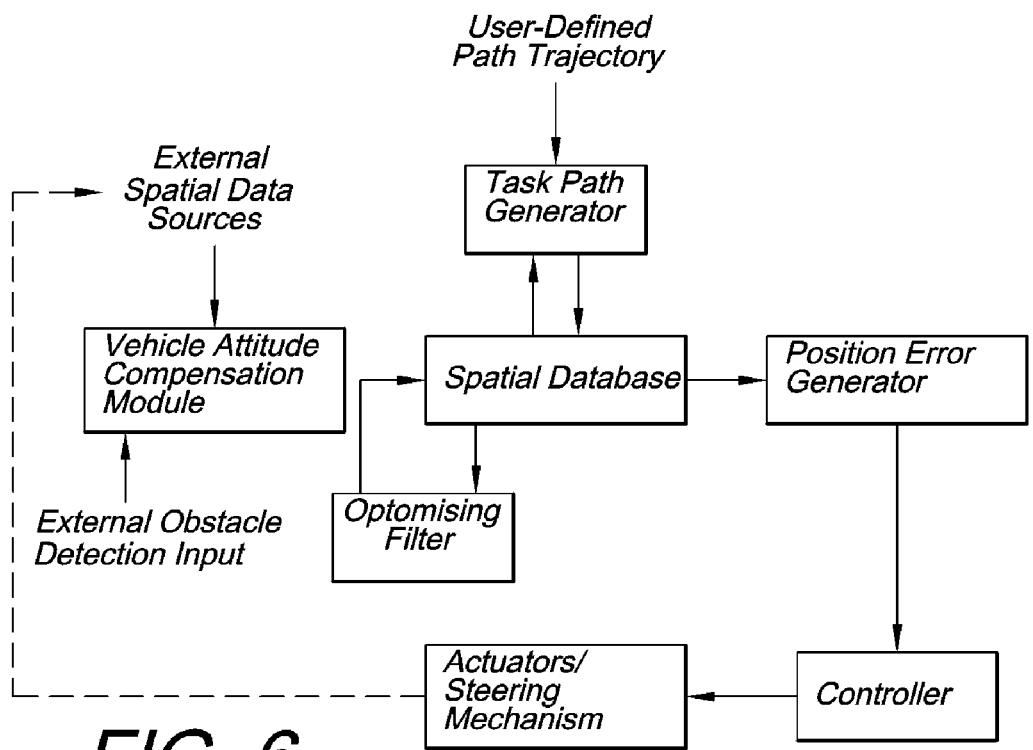
FIG. 6 is a further schematic "block-diagram" representation of an overall control system structure that may be used with alternative representative embodiments of the invention which incorporate additional features not shown in FIG. 4.

In FIG. 6, there is shown a slightly more elaborate embodiment of the control system. The embodiment shown in FIG. 6 is generally the same as that shown in FIG. 4, except that the embodiment in FIG. 6 incorporates an optimising filter and an external obstacle detection input. The optimising filter can operate to statistically optimise at least some of the spatial data contained in the spatial data base. Also, the filter will generally operate as an "observer", meaning that it does not form part of the control loop. Rather, the filter will typically reside outside the control loop and it will generally operate by taking data directly from the database and returning optimise data directly into the database, as shown in FIG. 6. More specifically, the filter will take the updated "feedback" data that re-enters the database from the control loop (described above) together with the updated spatial data obtained from the external spatial data sources (after it has been processed by the vehicle attitude compensation module) and it will then use these disparate streams of data to calculate a statistically optimised updated estimate of, for example, the vehicle's instantaneous position, heading and radius of curvature. The filter will typically comprise a Kalman filter.

The external obstacle detection input may comprise any form of vision based, sound based or other obstacle detection means, and the obstacle detection data may be converted by the vehicle attitude compensation module (just like the other sources of external data discussed above) and then fed into the spatial database. Where the control system incorporates obstacle detection, it is then necessary for the task path generator to be able to receive updated information from the spatial database. This is so that if an obstacle is detected on the desired path, an alternative path that avoids the obstacle can be calculated by the task path generator and re-entered into the database. The ability of the task path generator to also receive data from the spatial database is indicated by the additional arrow from the spatial database to the task path generator in FIG. 6.

FIGS. 4-6 graphically represent the operation of the control system. However, it is also useful to consider the way in which the vehicle's parameters and dynamics are represented for the purposes of implementing the control system. Those skilled in the art will recognise that a range of methods may be used for this purpose. However, it is considered that one method is to represent the parameters and dynamics in "state space" form.

In state space representations, the variables or parameters used to mathematically model the motion of the vehicle, or aspects of its operation, are referred to as "states" $x_i$. In the present case, the states may include the vehicle's position (x,y), velocity $$\left(\frac{dx}{dt}, \frac{dy}{dt}\right)$$

heading h, radius of curvature r etc. Hence the states may include $x_i = x$, $$x_2 = y, \; x_3 = h, \; x_4 = \dot{h}, \; x_5 = \frac{dx}{dt} = \frac{dx_1}{dt}, \; x_6 = \frac{dy}{dt} = \frac{dx_2}{dt}$$

etc. However, it will be appreciated that the choice of states is never unique, and the meaning and implications of this will be well understood by those skilled in the art.

The values for the individual states at a given time are represented as the individual entries in an n×1 "state vector":

$$\underline{X}(t) = [x_1(t) \; x_2(t) \; x_3(t) \; x_4(t) \ldots x_n(t)]^T$$

where n is the number of states.

In general, the mathematical model used to model the vehicle's motion and aspects of its operation will comprise a series of differential equations. The number of equations will be the same as the number of states. In some cases, the differential equations will be linear in terms of the states, whereas in other situations the equations may be nonlinear in which case they must generally be "linearised" about a point in the "state space". Linearisation techniques that may be used to do this will be well known to those skilled in this area.

Next, by noting that any $j^{th}$ order linear differential equations can be re-written equivalently as a set j first order linear differential equations, the linear (or linearised) equations that represent the model can be expressed using the following "state" equation:

$$\frac{d}{dt}(\underline{X}(t)) = A\underline{X}(t) + B\underline{U}(t) + E\underline{w}(t)$$

where:
A is an n×n matrix linking the state time derivatives to the states themselves,
$\underline{U}(t)$ is an m×1 matrix containing the external "forcing" inputs in the mathematical model,
B is an n×m matrix linking the state derivatives to the inputs,
m is the number of inputs,
$E\underline{w}(t)$ is a quantity (represented by an n×1 vector) called the "process noise".
The process noise represents errors in the model and vehicle dynamics which exist in the actual vehicle but which are not accounted for in the model. As $E\underline{w}(t)$ represents an unknown quantity, its contents are not known. However, for reasons that will be understood by those skilled in this area, in order to allow statistically optimised signal processing and state estimation $E\underline{w}(t)$ is generally assumed to be Gaussian, white, have zero mean and to act directly on the state derivatives. It is also assumed that the process noise element associated with each individual state is uncorrelated with the process noise element of the other states.

The quantities that are desired to be known about the vehicle (the real values for which are generally also measured from the vehicle itself, if possible) are the outputs $y_i$ from the model. Each of the outputs generated by the linear (or linearised) model comprises a linear combination of the states $x_i$ and inputs $u_i$, and so the outputs can be defined by the "output" or "measurement" equation:

$$\underline{Y}(t) = C\underline{X}(t) + D\underline{U}(t) M\underline{v}(t)$$

where
C is a j×n matrix linking the outputs to the states,
D is a j×m matrix linking the outputs to the inputs,
j is the number of outputs, and
$M\underline{v}(t)$ is a quantity (represented by an n×1 vector) called the "measurement noise". The measurement noise represents errors and noise that invariably exist in measurements taken from the actual vehicle. Like E$\underline{w}$(t) above, M$\underline{v}$(t) is assumed to be Gaussian, white, have zero mean, to act directly on the state derivatives and to be uncorrelated with the process noise or itself.

Next, it will be noted that both the state equation and the measurement equation defined above are continuous functions of time. However, continuous time functions do not often lend themselves to easy digital implementation (such as will generally be required in implementing the present invention) because digital control systems generally operate as recursively repeating algorithms. Therefore, for the purpose of implementing the equations digitally, the continuous time equations may be converted into the following recursive discrete time equations by making the substitutions set out below and noting that (according to the principle of superposition) the overall response of a linear system is the sum of the free (unforced) response of that system and the responses of that system due to forcing/driving inputs. The recursive discrete time equations are:

$$\underline{X}_{k+1} = F\underline{X}_k + G\underline{U}_{k+1} + L\underline{w}_{k+1}$$

$$\underline{Y}_{k+1} = Z\underline{X}_k + J\underline{U}_{k+1} + N\underline{v}_{k+1}$$

where k+1 is the time step occurring immediately after time step k,

Z=C, J=D and N$\underline{v}$ is the discrete time analog of the continuous time measurement noise M$\underline{v}$(t).

F is a transition matrix which governs the free response of the system. F is given by:

$$F = e^{A\Delta t}$$

G$\underline{U}_{k+1}$ is the forced response of the system, i.e. the system's response due to the driving inputs. It is defined by the convolution integral as follows:

$$G\underline{U}_{k+1} = \int_0^{\Delta t} e^{A(\Delta t - \tau)} B\underline{U}(t_{k+1} + \tau) d\tau$$

Similarly, the quantity L$\underline{w}_{k+1}$ is the (forced) response of the system due to the random "error" inputs that make up the process noise. Hence, conceptually this quantity may be defined as:

$$L\underline{w}_{k+1} = \int_0^{\Delta t} e^{A(\Delta t - \tau)} E\underline{w}(t_{k+1} + \tau) d\tau$$

However, as noted above, the quantity E$\underline{w}$(t) is not deterministic and so the integral defining L$\underline{w}_{k+1}$ cannot be performed (even numerically). It is for this reason that it is preferable to use statistical filtering techniques such as a "Kalman Filter" to statistically optimise the states estimated by the mathematical model.

In general, a "Kalman Filter" operates as a "predictor-corrector" algorithm. Hence, the algorithm operates by first using the mathematical model to "predict" the value of each of the states at time step k+1 based on the known inputs at time step k+1 and the known value of the states from the previous time step k. It then "corrects" the predicted value using actual measurements taken from the vehicle at time step k+1 and the optimised statistical properties of the model. In summary, the Kalman Filter comprises the following equations each of which is computed in the following order for each time step:

$$\left. \begin{array}{l} \underline{X}_{k+1|k} = F\underline{X}_{k|k} + G\underline{U}_{k+1} \\ P_{k+1|k} = FP_{k|k}F^T + Q \\ K_{k+1} = P_{k+1|k}Z^T(ZP_{k+1|k}Z^T + R)^{-1} \\ \underline{Y}_{k+1} = Z\underline{X}_{k+1|k} + J\underline{U}_{k+1} \\ \underline{v}_{k+1} = \hat{Y}_{k+1} - \underline{Y}_{k+1} \end{array} \right\} \text{predictor}$$

$$\left. \begin{array}{l} \underline{X}_{k+1|k+1} = \underline{X}_{k+1|k} + K_{k+1}\underline{v}_{k+1} \\ P_{k+1|k+1} = (I - K_{k+1}Z)P_{k+1|k} \end{array} \right\} \text{corrector}$$

where the notation k+1|k means the value of the quantity in question at time step k+1 given information from time step k. Similarly, k+1|k+1 means the value of the quantity at time step k+1 given updated information from time step k+1.

P is the co-variance in the difference between the estimated and actual value of $\underline{X}$.

Q is the co-variance in the process noise.

K is the "Kalman gain" which is a matrix of computed coefficients used to optimally "correct" the initial state estimate.

R is the co-variance in the measurement noise.

$\hat{Y}$ is a vector containing measurement values taken from the actual vehicle.

$\underline{v}$ is a quantity called the "innovation" which is the difference between the measured values actually taken from the vehicle and values for the corresponding quantities estimated by the model.

Figure 7:
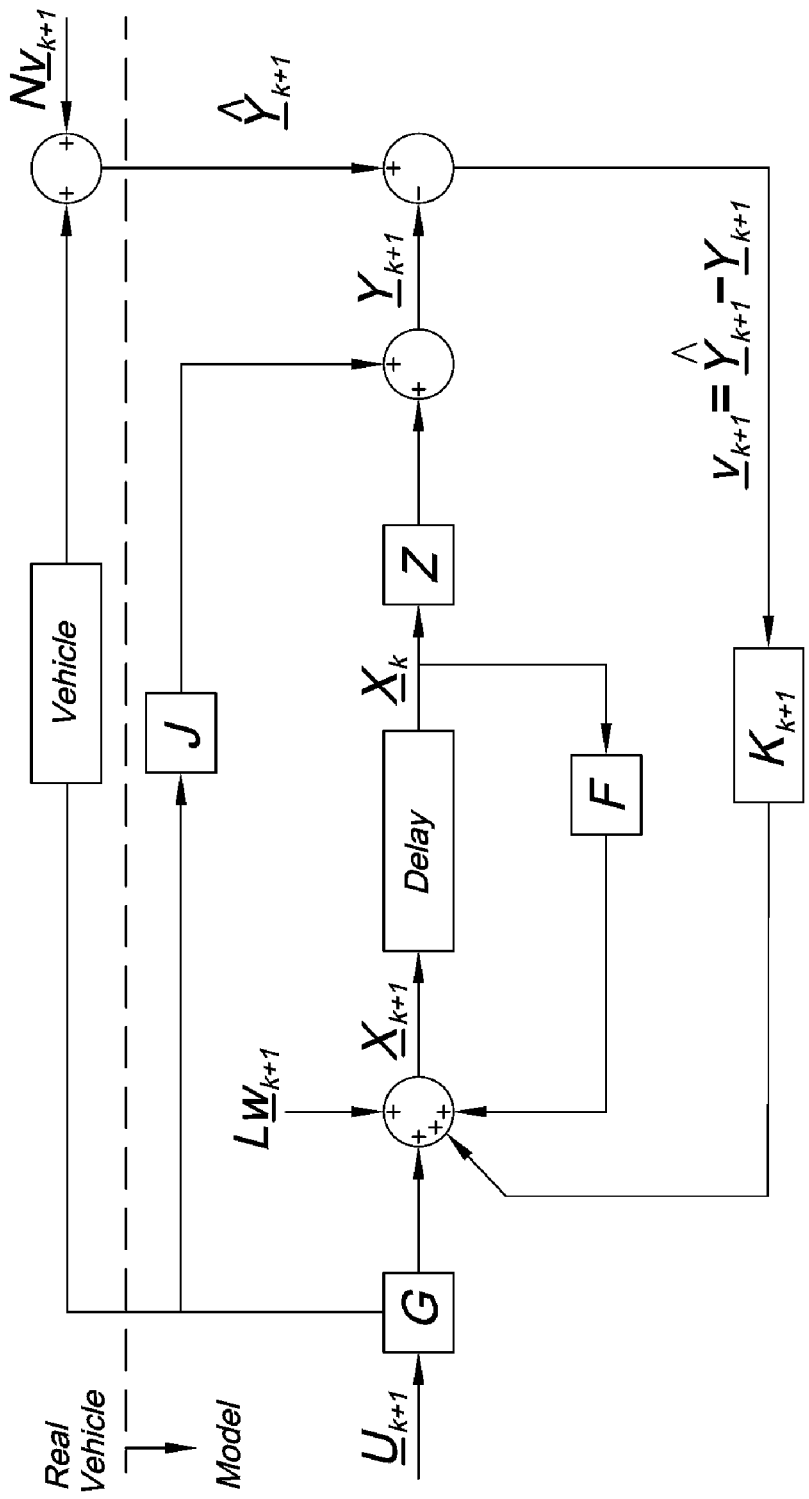
FIG. 7 is a block diagram representation of the state space representation used in the digital implementation of certain aspects of the control system.

The operation of the discrete time state space equations outlined above, including the Kalman gain and the overall feedback closed loop control structure, are represented graphically in FIG. 7.

In relation to the spatial database, it is mentioned above that a wide range of methods are known for arranging data within databases. One commonly used technique is to provide a "hash table". The hash table typically operates as a form of index allowing the computer (in this case the control system CPU) to "look up" a particular piece of data in the database (i.e. to look up the location of that piece of data in memory). In the context of the present invention, pieces of data pertaining to particular locations along the vehicle's path are assigned different hash keys based on the spatial location to which they relate. The hash table then lists a corresponding memory location for each hash key. Thus, the CPU is able to "look up" data pertaining to a particular location by looking up the hash key for that location in the hash table which then gives the corresponding location for the particular piece of data in memory. In order to increase the speed with which these queries can be carried out, the hash keys for different pieces of spatial data can be assigned in such a way that "locality" is maintained. In other words, points which are close to each other in the real world should be given closely related indices in the hash table (i.e. closely related hash keys).

Figure 8:
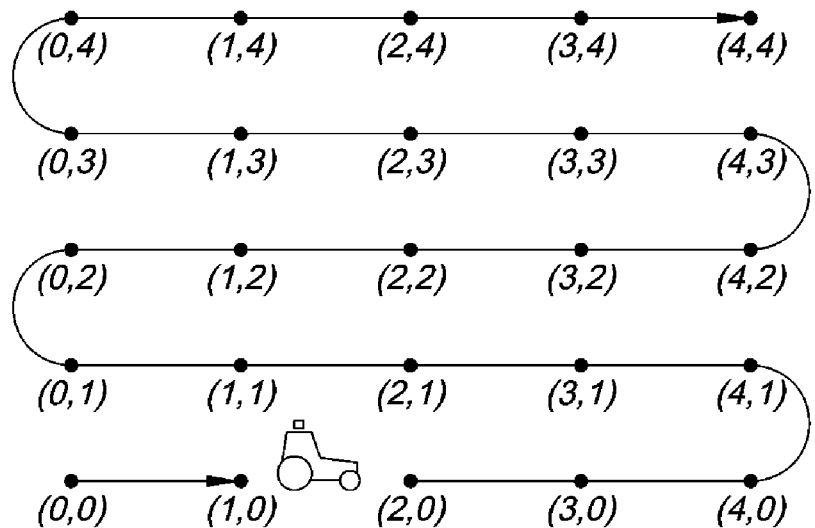
FIG. 8 shows an example trajectory of an agricultural vehicle, and the coordinates corresponding to different points along the trajectory using a simplified integer based coordinate system.

The spatial hash algorithm used to generate hash keys for different spatial locations in representative embodiments of the present invention may be most easily explained by way of a series of examples. To begin, it is useful to consider the hypothetical vehicle path trajectory shown in FIG. 8. In FIG. 8, the successive points which define the path are described by a simplified integer based (X,Y) coordinate system. Hence, in FIG. 8, the vehicle moves in the X direction along the entire length of the first swath from (0,0) to (4,0), before moving up in the Y direction to then move back along the second swath in the opposite direction from (4,1) to (0,1), etc.

As outlined above, in the present invention all data is stored within the spatial database with reference to spatial location. Therefore, it is necessary to assign indices or "hash keys" to each piece of data based on the spatial location to which each said piece of data relates. However, it will be recalled that the hash table must operate by listing the hash key for each particular spatial location together with the corresponding memory location for data pertaining to that spatial location. Therefore, the hash table is inherently one-dimensional, and yet it must be used to link hash keys to corresponding memory allocations for data that inherently pertains to two-dimensional space.

One simple way of overcoming this problem would be to simply assign hash keys to each spatial location based only on, say, the Y coordinate at each location. The hash keys generated in this way for each point on the vehicle path in FIG. 8 are given in Table 1 below.

TABLE 1

Spatial Hash Key Generated Using Only the Y Coordinate

| (X, Y) coordinates | Hash key (hexadecimal) | Hash key (decimal) |
|---|---|---|
| (0, 0) | 0x0 | 0 |
| (1, 0) | 0x0 | 0 |
| (2, 0) | 0x0 | 0 |
| (3, 0) | 0x0 | 0 |
| (4, 0) | 0x0 | 0 |
| (0, 1) | 0x1 | 1 |
| (1, 1) | 0x1 | 1 |
| (2, 1) | 0x1 | 1 |
| (3, 1) | 0x1 | 1 |
| (4, 1) | 0x1 | 1 |
| (0, 2) | 0x2 | 2 |
| (1, 2) | 0x2 | 2 |
| (2, 2) | 0x2 | 2 |
| (3, 2) | 0x2 | 2 |
| (4, 2) | 0x2 | 2 |
| (0, 3) | 0x3 | 3 |
| (1, 3) | 0x3 | 3 |
| (2, 3) | 0x3 | 3 |
| (3, 3) | 0x3 | 3 |
| (4, 3) | 0x3 | 3 |
| (0, 4) | 0x4 | 4 |
| (1, 4) | 0x4 | 4 |
| (2, 4) | 0x4 | 4 |
| (3, 4) | 0x4 | 4 |
| (4, 4) | 0x4 | 4 |

The prefix "0x" indicates that the numbers in question are expressed in hexadecimal format. This is a conventional notation.

Those skilled in the art will recognise that the above method for generating hash keys is far from optimal because there are five distinct spatial locations assigned to each different hash key. Furthermore, in many instances, this method assigns the same hash key to spatial locations which are physically remote from each other. For instance, the point (0,1) is distant from the point (4,1), and yet both locations are assigned the same hash key. An identically ineffective result would be obtained by generating a hash key based on only the X coordinate.

An alternative method would be to generate hash keys by concatenating the X and Y coordinates for each location. The hash keys generated using this method for each point on the vehicle path in FIG. 8 are given in Table 2 below.

TABLE 2

Hash Keys Generated by Concatenating the X and Y Coordinates

| (X, Y) coordinates | Hash key (hexadecimal) | Hash key (decimal) |
|---|---|---|
| (0, 0) | 0x0 | 0 |
| (1, 0) | 0x100 | 256 |
| (2, 0) | 0x200 | 512 |
| (3, 0) | 0x300 | 768 |
| (4, 0) | 0x400 | 1024 |
| (0, 1) | 0x1 | 1 |
| (1, 1) | 0x101 | 257 |
| (2, 1) | 0x201 | 513 |
| (3, 1) | 0x301 | 769 |
| (4, 1) | 0x401 | 1025 |
| (0, 2) | 0x2 | 2 |
| (1, 2) | 0x102 | 258 |
| (2, 2) | 0x202 | 514 |
| (3, 2) | 0x302 | 770 |
| (4, 2) | 0x402 | 1026 |
| (0, 3) | 0x3 | 3 |
| (1, 3) | 0x103 | 259 |
| (2, 3) | 0x203 | 515 |
| (3, 3) | 0x303 | 771 |
| (4, 3) | 0x403 | 1027 |
| (0, 4) | 0x4 | 4 |
| (1, 4) | 0x104 | 260 |
| (2, 4) | 0x204 | 516 |
| (3, 4) | 0x304 | 772 |
| (4, 4) | 0x404 | 1028 |

In order to understand how the numbers listed in Table 2 above were arrived at, it is necessary to recognise that in the digital implementation of the present control system, all coordinates will be represented in binary. For the purposes of the present example which relates to the simplified integer based coordinate system in FIG. 8, a simplified 8-bit binary representation has been used.

Hence, to illustrate the operation of the spatial hash key algorithm used to generate the numbers in Table 2, consider the point (3,3). Those skilled in the art will understand that the decimal number 3 may be written as 11 in binary notation. Therefore, the location (3,3) may be rewritten in 8-bit binary array notation as (00000011,00000011). Concatenating these binary coordinates then gives the single 16-bit binary hash key 0000001100000011 which can equivalently be written as the hexadecimal number 0x303 or the decimal number 771. The process of converting between decimal, binary and hexadecimal representations should be well known to those skilled in the art and need not be explained.

It will be noted from Table 2 above that concatenating the X and Y coordinates leads to unique hash keys (in this example) for each spatial location. However, the hash keys generated in this way are still somewhat sub-optimal because points which are located close to each other are often assigned vastly differing hash keys. For example, consider the points (0,0) and (1,0). These are adjacent point in the "real world". However, the hash keys assigned to these points using this method (written in decimal notation) are 0 and 256 respectively. In contrast, the point (0,4) is much further away from (0,0) and yet it is assigned the much closer hash key 4. Therefore, this algorithm does not maintain "locality", and an alternative algorithm would be preferable.

Yet a further method for generating hash keys is to use a technique which shall hereinafter be referred to as "bitwise interleaving". As for the previous example, the first step in this technique is to represent the (X,Y) coordinates in binary form. Hence, using the 8-bit binary array representation discussed above, the point (X,Y) may be re-written in 8-bit binary array notation as $(x_1X_2X_3X_4X_5X_6X_7X_8, Y_1Y_2Y_3Y_4Y_5Y_6Y_7Y_8)$. Next, rather than concatenating the X and Y coordinates to arrive at a single 16-bit binary hash key, the successive bits from the X and Y binary coordinates are alternatingly "interleaved" to give the following 16-bit binary hash key $X_1Y_1X_2Y_2X_3Y_3X_4Y_4X_5Y_5X_6Y_6X_7Y_7X_8Y_8$. The hash keys generated using this method for each point on the vehicle path in FIG. 8 are given in Table 3 below.

TABLE 3

Hash Keys Generated by "Bitwise Interleaving" the X and Y Coordinates

| (X, Y) coordinates | Hash key (hexadecimal) | Hash key (decimal) |
|---|---|---|
| (0, 0) | 0x0 | 0 |
| (1, 0) | 0x2 | 2 |
| (2, 0) | 0x8 | 8 |
| (3, 0) | 0xa | 10 |
| (4, 0) | 0x20 | 32 |
| (0, 1) | 0x1 | 1 |
| (1, 1) | 0x3 | 3 |
| (2, 1) | 0x9 | 9 |
| (3, 1) | 0xb | 11 |
| (4, 1) | 0x21 | 33 |
| (0, 2) | 0x4 | 4 |
| (1, 2) | 0x6 | 6 |
| (2, 2) | 0xc | 12 |
| (3, 2) | 0xe | 14 |
| (4, 2) | 0x24 | 36 |
| (0, 3) | 0x5 | 5 |
| (1, 3) | 0x6 | 7 |
| (2, 3) | 0xd | 13 |
| (3, 3) | 0xf | 15 |
| (4, 3) | 0x25 | 37 |
| (0, 4) | 0x10 | 16 |
| (1, 4) | 0x12 | 18 |
| (2, 4) | 0x18 | 24 |
| (3, 4) | 0x1a | 26 |
| (4, 4) | 0x30 | 48 |

To further illustrate the operation of the spatial hash algorithm used to generate the numbers in Table 3, consider the point (3,4). As noted above, the decimal number 3 may be written as 11 in binary notation. Similarly, decimal number 4 is written as 100 in binary. Therefore, the location (3,4) may be rewritten in 8-bit binary array notation as (00000011, 00000100). Bitwise interleaving these binary coordinates then gives the single 16-bit binary hash key 0000000000011010, which can equivalently be written as the hexadecimal number 0x1a or the decimal number 26.

From Table 3 it will be seen that generating hash keys by "bitwise interleaving" the X and Y coordinates leads to unique hash keys (in this example) for each spatial location. Also, the hash keys generated in this way satisfy the requirement that points which are close together in the real world are assigned closely related hash keys. For example, consider again the points (0,0) and (1,0). The hash keys now assigned to these points by "bitwise interleaving" (when written in decimal notation) are 0 and 2 respectively. Furthermore, the point (0,1) which is also nearby is also assigned the closely related hash key 1. Conversely, points which are separated by a considerable distance in the real world are given considerably differing hash keys, for example, the hash key for (4,3) is 37.

From the example described with reference to Table 3, it can be seen that generating hash keys by "bitwise interleaving" the binary X and Y coordinates preserves "locality". This example therefore conceptually illustrates the operation of the bitwise interleaving spatial hash algorithm that may be used with representative embodiments of the present invention. However, the above example is based on the simplified integer based coordinate system shown in FIG. 8. In order to understand the actual algorithm that may be used in the implementation of the present control system, it is necessary to take into account certain other complexities. These complexities include:

the fact that GPS and other similar systems which describe spatial location typically do so using IEEE double-precision floating-point numbers (not simple integers). For instance, GPS supplies coordinates in the form of (X,Y) coordinates where X corresponds to longitude, and Y corresponds to latitude. Both X and Y are given in units of decimal degrees.

the fact that certain spatial locations have negative coordinate values when described using GPS and other similar coordinate systems. For example, using the WGS84 datum used by current GPS, the coordinates (153.00341,−27.47988) correspond to a location in Queensland, Australia (the negative latitude value indicates southern hemisphere).

complexities inherent in representing numbers in accordance with the IEEE double-precision floating-point numbers standard.

Figure 9:
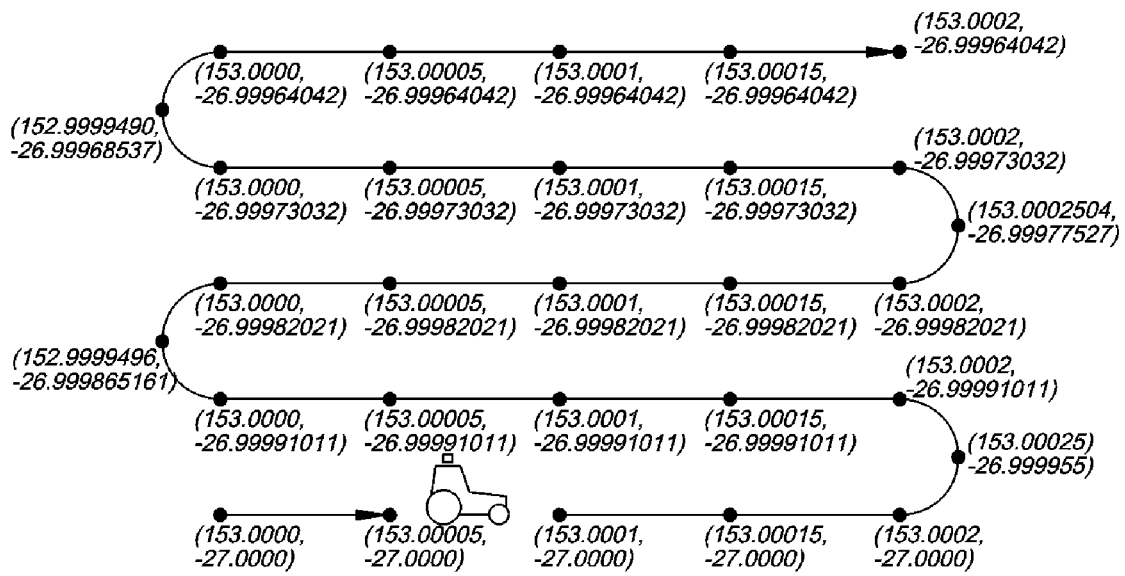
FIG. 9 shows a similar example trajectory of an agricultural vehicle to that shown in FIG. 8, except that the coordinate system is similar in format to the WGS84 coordinate used by current GPS.

FIG. 9 shows an example vehicle path similar to that shown in FIG. 8, except that the coordinates used to describe the points along the path in FIG. 9 correspond to a "realistic" coordinate system such as that used by current GPS. In order to understand the implementation of the bitwise interleaving spatial hash algorithm when applied to these realistic coordinates, it is necessary to first appreciate certain aspects regarding the way numbers are represented using the standard IEEE double-precision floating-point number format.

Figure 10:
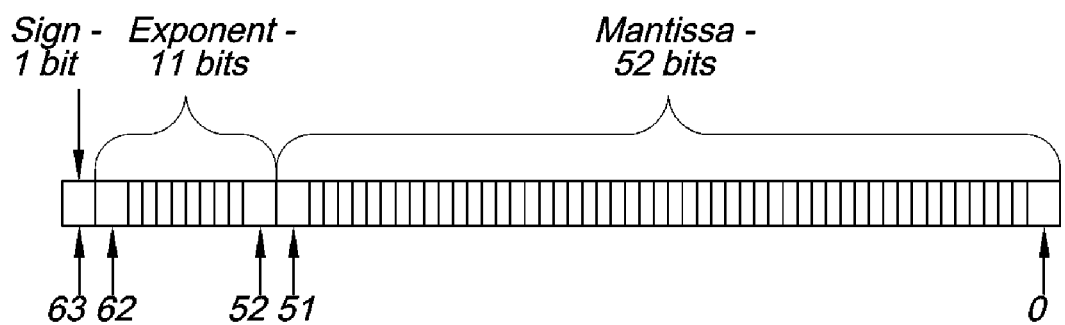
FIG. 10 illustrates the way in which numbers are represented in the IEEE 754 standard double-precision floating-point format.

A double-precision floating-point number represented in accordance with the IEEE 754 standard comprises a string of 64 binary characters (64 bits) as shown in FIG. 10. The number is represented in three parts, namely the sign, the exponent and the mantissa. The sign comprises one bit. If the sign bit is 1 then the number is negative, and conversely if the sign bit is 0 then the number is positive. The exponent comprises eleven binary characters, and hence can range from 00000000000 to 11111111111. However, because of the need to represent numbers that are both greater and smaller than one, it is necessary to be able to represent both large positive and large negative values for the exponent. However, it is not desirable to use one of the exponent bits to represent the sign of the exponent because this would leave fewer bits available to represent the exponent's actual value and would therefore greatly limit the size of the numbers that could be represented. Therefore, in the IEEE standard 64 bit format, the true value of the exponent is given by the binary number actually written by the eleven exponent bits minus an implied exponent bias.

Hence, Actual exponent value=written exponent value−exponent bais

The exponent bias is 0x3ff=1023. Consequently, the maximum true exponent value that can be represented (written in decimal notation) is 1023, and the minimum true exponent value that can be represented is −1022.

Finally, the remaining 52 bits form the mantissa. However, as all non-zero numbers must necessarily have a leading "1" when written in binary notation, an implicit "1" followed by a binary point is assumed to exist at the front of the mantissa. In other words, the leading "1" and the binary point which must necessarily exist for all non-zero binary numbers is simply omitted from the actual written mantissa in the IEEE 64-bit standard format. This is so that an additional bit may be used to represent the number with greater precision. However, when interpreting numbers which are represented in accordance with the IEEE standard, it is important to remember that this leading "1" and the binary point implicitly exist even though they are not written.

Bearing in mind these issues, it is possible to understand the actual spatial hash algorithm used in representative implementations of the present control system. A "worked" example illustrating the operation of the spatial hash algorithm to generate a hash key based on the coordinate (153.0000°,−27.0000°) is given in the form of a flow diagram in FIG. 11. The points are initially expressed in terms of decimal degrees as this is the format in which they are delivered from, for example, GPS.

Figure 11:
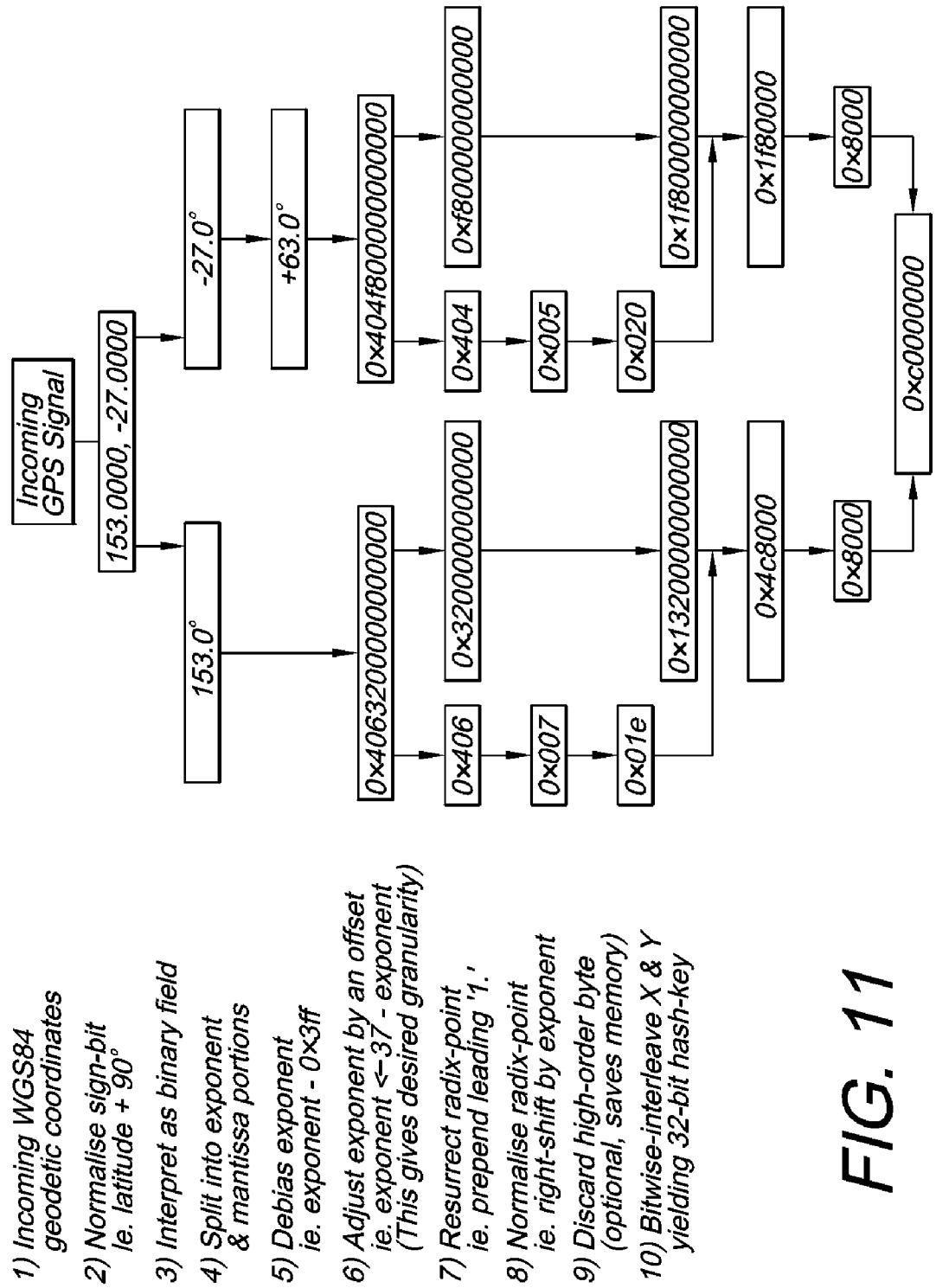
FIG. 11 is a "flow-diagram" illustrating the way a particularly preferred spatial hash algorithm may be used to generate hash keys for the coordinates in FIG. 9.

From FIG. 11 it can be seen that in order to implement the algorithm the X and Y coordinates are separated. The next step is to "normalise" the signs of the respective coordinates (in this case only the Y coordinate needs to be normalized). The reason for normalising the signs of the coordinate is because, when calculating a spatial hash key, it is more convenient to eliminate negative sign bits from the coordinates. In the case of the latitude coordinate, those skilled in this area will recognise that latitude is conventionally written as a number in the range (−90°≦latitude≦90°). Therefore, by simply adding 90° to the value of the latitude coordinate, the spatial hash algorithm can operate with values in the equivalent "un-signed" or "normalised" latitude range (0°≦latitude≦180°). Those skilled in the art will appreciate that the longitude coordinates can also be normalised to fall within the range (0°≦longitude≦360°), although that is not necessary in this example.

After normalising the coordinates, the next step is to convert the respective coordinates from their representations in decimal degrees into binary IEEE double-precision floating-point number format. This is shown as step 3) in FIG. 11. However, it will be noted that the binary coordinate representations (and all other numbers which are generated or used by the algorithm in binary form) have been written in the alternative hexadecimal notation for ease of reference and to save space in FIG. 11.

Next, the binary representations of the two coordinates are split into their respective exponent (11 bits) and mantissa (52 bits) portions. This is step 4) in FIG. 11. Then, in order to determine the correct ("true") value of the exponent, the exponent for each of the coordinate is "de-biased" by subtracting the implicit exponent bias (0x3ff=1023) as described above. This is step 5).

After de-biasing the exponents, the resulting exponents are then adjusted by a selected offset. The size of the offset is selected depending on the desired "granularity" of the resulting fix-point number. In the particular example shown in step 6) of FIG. 11, the offset is 37, however those skilled in the art will appreciate this number can be varied to suit.

After adjusting the exponent, the next step is to "resurrect" the leading "1" and the binary point which implicitly exist in the mantissa but which are left off when the mantissa is actually written (see above). Hence, the leading "1" and the binary point are simply prepended to the mantissa of each of the coordinates. This is step 7) in FIG. 11.

The mantissa for each coordinate is then right-shifted by the number of bits in the corresponding exponent. The exponents for each coordinate are then prepended to their corresponding mantissas forming a single character string for each coordinate. There is then an optional step of discarding the high-order byte for each of the two bit fields. This may be done simply to save memory if required, but is not necessary. Finally, the resultant bit fields for each coordinate are bitwise interleaved to obtain a single hash key corresponding to the original coordinates. In the example shown in FIG. 11, the resultant hash key is 32-bits in length. However, the length of the resultant hash key may vary depending on, for example whether the high-order byte is discarded, etc.

Those skilled in the art will recognise that various other alterations and modifications may be made to the particular embodiments, aspects and features of the invention described without departing from the spirit and scope of the invention.

The invention claimed is:

1. A control system for controlling a vehicle and an implement towed by the vehicle within a region to be traversed, the vehicle including an automatic steering system and roll, pitch and yaw axes, and the control system comprising:
   a spatial database containing spatial data corresponding to GPS-defined positions in the region,
   a controller adapted to receive spatial data from the spatial database at control speed to control the vehicle as the vehicle traverses the region, the controller being adapted to control the steering of the vehicle,
   external spatial data sources mounted on the vehicle and comprising: a GPS system including an antenna and a receiver; an inertial navigation system (INS) including a gyroscope and an accelerometer; a tilt sensor; and a visual sensor adapted for receiving images of the ground beneath the vehicle and inputting the images to the controller,
   the controller correlating the images to obtain data relating to the vehicle's motion,
   a vehicle reference point located at an intersection of the vehicle roll, pitch and yaw axes,
   an implement reference point associated with a location on the implement,
   the spatial database being adapted to receive updated spatial data from the controller and the external spatial data sources as the vehicle traverses the region,
   the updated spatial data relating to a combination of the vehicle, the implement associated with and proximate the vehicle, the region or at least a portion of the region proximate the vehicle,
   the controller receiving a user-defined path trajectory comprising desired vehicle positions, desired vehicle headings and desired vehicle radii of curvature,
   the controller inputting the user-defined path trajectory into the spatial database,
   the controller including a task path generator receiving data from spatial database,
   the controller including a vehicle attitude compensation module,
   a position error generator adapted for comparing said user-defined path trajectory with spatial data from said spatial database corresponding to an actual vehicle trajectory,
   said controller being adapted for updating said path trajectory based on said position error generator comparison, and
   said controller including a cross-track error proportional-integral-derivative (PID) controller, a heading error PID controller and a curvature error PID controller providing input to said vehicle attitude compensation module for use by said position error generator in connection with correcting said path trajectory.

2. A control system as claimed in claim 1, wherein the spatial database is adapted to provide spatial data to other parts of the control system.

3. A control system as claimed in claim 1, wherein the spatial data received by the controller from the spatial data base forms at least part of the control inputs that the controller uses to control the vehicle.

4. A control system as claimed in claim 1 having a feed forward control structure.

5. A control system as claimed in claim 1, wherein the control system has memory and a central processing unit.

6. A control system as claimed in claim 1, having a closed loop or feedback control structure.

7. A control system as claimed in claim 6, implemented using a state space representation.

8. A control system as claimed in claim 7, having a state feedback control structure.

9. A control system as claimed in claim 7, having an output feedback control structure.

10. A control system as claimed in claim 6, wherein the controller operates using a combination of proportional, integral and differential control.

11. A control system as claimed in claim 10, wherein the controller comprises a plurality of nested control loops.

12. A control system as claimed in of claim 1, having an open loop control structure.

13. A control system as claimed in claim 1 including actuators responsive to a control signal produced by the control system.

14. A control system as claimed in claim 1, incorporating means for filtering updated spatial data.

15. A control system as claimed in claim 1, wherein the updated spatial data is filtered in real time or close to it.

16. A control system as claimed in claim 13, incorporating signal transmitting means for transmitting one or more control signals from the control system to the actuators.

17. A control system as claimed in claim 16, comprising amplifiers to amplify the control signal transmitted to the actuators.

18. A control system as claimed in claim 1, wherein the database exhibits low latencies between its inputs and outputs.

19. A control system as claimed in claim 1, wherein there is at least one clock speed associated with the controller, and the database is adapted to provide data to the controller at a rate of the same order as at least one of said clock speeds.

20. A control system as claimed in claim 19, wherein the spatial database is adapted to provide data to the controller at a rate of between 1 Hz and 100 Hz.

21. A control system as claimed in claim 20, wherein the spatial database is adapted to provide data to the controller at a rate of between 1 Hz and 20 Hz.

22. A control system as claimed in claim 21, wherein the spatial database is adapted to provide data to the controller at a rate of between 3 Hz and 12 Hz.

23. A control system as claimed in claim 1, wherein the database is loaded into the control system's memory.

24. A control system as claimed in claim 1, wherein the database is loaded on a disk or other storage device separate from the control system's memory.

25. A control system as claimed in claim 1, wherein the spatial data base has a flat structure.

26. A control system as claimed in claim 1, wherein every item of spatial data is indexed uniquely in the database.

27. A control system as claimed in claim 1, wherein the vehicle is an agricultural vehicle and the region is a field.

28. A method for controlling a vehicle and an implement towed by the vehicle within a region to be traversed, the vehicle including an automatic steering system and roll, pitch and yaw axes, the method comprising the steps:
providing a spatial database;
populating said database with spatial data corresponding to GPS-defined positions in the region;
providing a position error generator;
providing a controller;
mounting said controller to said vehicle;
traversing the region with said vehicle towing said implement;
receiving spatial data with said controller from the spatial database at control speed;
controlling the steering of the vehicle with the controller as the vehicle traverses the region;
providing the controller with a task path generator;
receiving data from the spatial database with the controller and controller task path generator;
providing the controller with a vehicle attitude compensation module;
providing the controller with a cross-track error proportional-integral-derivative (PID) controller, a heading error PID controller and a curvature error PID controller;
providing input to said vehicle attitude compensation module and using said position error generator in connection with attitude compensation module for correcting said path trajectory;
mounting external spatial data sources on the vehicle, said external spatial data sources comprising: a GPS system including an antenna and a receiver; an inertial navigation system (INS) including a gyroscope and an accelerometer; a tilt sensor; and a visual sensor;
receiving images of the ground beneath the vehicle using the controller and visual sensor;
inputting said ground images to the controller;
correlating the images with said controller to obtain data relating to the vehicle's motion;
designating and locating a vehicle reference point at an intersection of the vehicle roll, pitch, and yaw axes;
locating and associating an implement reference point on the implement;
updating said spatial database with spatial data from the controller and said external spatial data sources as the vehicle traverses the region;
inputting a user-defined path trajectory comprising desired vehicle positions, desired vehicle headings, and desired vehicle radii of curvature into said controller;
inputting the user-defined path trajectory into the spatial database with said controller;
comparing the user-defined path trajectory with spatial data from said spatial database corresponding to an actual vehicle trajectory using said position error generator;
updating said path trajectory with said controller based on said position error generator comparison; and
steering the vehicle and using updated path trajectory.

29. The method of claim 28, wherein:
the vehicle is an agricultural vehicle; and
the region is a field.

30. The method of claim 28, further comprising the step:
providing spatial data to other parts of the control system using the spatial database.

31. The method of claim 28, further comprising the step:
forming at least part of the control inputs the controller uses to control and steer the vehicle from spatial data received by the controller from the spatial database.

32. The method of claim 28, further comprising the step:
providing a feed forward control structure.

33. The method of claim 28, further comprising the steps:
providing a memory storage device;
providing a central processing unit; and
connecting said memory storage device and central processing unit to the controller.

34. The method of claim 28, further comprising the step: providing a closed loop or feedback control structure.

35. The method of claim 28, further comprising the step: providing actuators responsive to control signals produced by the controller.

36. The method of claim 28, further comprising the step: providing a means for filtering updated spatial data.

37. The method of claim 36, further comprising the step: filtering updated spatial data in real time or close to it.

38. The method of claim 28, wherein the database exhibits low latencies between its inputs and its outputs.

39. The method of claim 28, further comprising the steps: providing at least one clock speed associated with the controller; and
providing data to the controller at a rate of the same order as at least one of said clock speeds using the database.

40. The method of claim 33, further comprising the step: loading the database into the control system's memory storage device.

41. The method of claim 33, further comprising the step: loading the database onto a disk or other storage device separate from the control system's memory storage device.

42. The method of claim 28, wherein the spatial data base has a flat structure.

43. The method of claim 42, further comprising the step: indexing every item of spatial data uniquely within the database.

* * * * *